US012299368B2

(12) United States Patent
Misaka et al.

(10) Patent No.: US 12,299,368 B2
(45) Date of Patent: May 13, 2025

(54) METHOD OF MANUFACTURING A SEMICONDUCTOR DEVICE

(71) Applicant: SAMSUNG ELECTRONICS CO., LTD., Suwon-si (KR)

(72) Inventors: Akio Misaka, Hwaseong-si (KR); Jongdoo Kim, Yongin-si (KR); Noyoung Chung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 706 days.

(21) Appl. No.: 17/554,517

(22) Filed: Dec. 17, 2021

(65) Prior Publication Data
US 2022/0292245 A1    Sep. 15, 2022

(30) Foreign Application Priority Data

Mar. 15, 2021   (KR) ................. 10-2021-0033597

(51) Int. Cl.
  *G06F 30/392*   (2020.01)
  *G03F 7/00*     (2006.01)
  *G06F 30/398*   (2020.01)
  *G06F 119/18*   (2020.01)
  *H01L 27/02*    (2006.01)

(52) U.S. Cl.
  CPC ........ *G06F 30/392* (2020.01); *G03F 7/70441* (2013.01); *G06F 30/398* (2020.01); *H01L 27/0207* (2013.01); *G06F 2119/18* (2020.01)

(58) Field of Classification Search
  CPC ... G06F 30/392; G06F 30/398; H01L 27/0207
  USPC ........................................................ 716/53
  See application file for complete search history.

(56) References Cited

U.S. PATENT DOCUMENTS

| | | | |
|---|---|---|---|
| 7,103,870 B2 | 9/2006 | Misaka et al. | |
| 8,563,197 B2 | 10/2013 | Suh et al. | |
| 9,436,792 B2 | 9/2016 | Baek et al. | |
| 10,372,863 B2 | 8/2019 | Burke et al. | |
| 10,521,537 B2 | 12/2019 | Wu et al. | |
| 10,628,550 B2 | 4/2020 | Kim et al. | |
| 10,803,227 B2 | 10/2020 | Liao et al. | |
| 2001/0028991 A1* | 10/2001 | Inanami | H01J 37/3174 430/296 |

(Continued)

FOREIGN PATENT DOCUMENTS

KR   10-2008-0001439 A   1/2008

OTHER PUBLICATIONS

Paek et al., Proc. SPIE, vol. 7275-71 Preprint.

*Primary Examiner* — Jack Chiang
*Assistant Examiner* — Suchin Parihar
(74) *Attorney, Agent, or Firm* — Muir Patent Law, PLLC

(57) ABSTRACT

A method of manufacturing a semiconductor device is disclosed. The method includes generating a first virtual layout by placing and routing standard cells using a virtual netlist, searching first duplicate pattern regions in the first virtual layout and choosing one of them as a first representative pattern region, performing an OPC operation on the first representative pattern region to obtain a first OPC result, generating an actual layout by placing and routing standard cells using an actual netlist, performing an OPC operation on the actual layout, and forming a photoresist pattern on a substrate using a photomask manufactured based on the actual layout, to which the OPC operation is applied.

20 Claims, 42 Drawing Sheets

(56) References Cited

U.S. PATENT DOCUMENTS

| | | | |
|---|---|---|---|
| 2007/0226674 A1* | 9/2007 | Haffner | G03F 1/36 |
| | | | 438/689 |
| 2009/0031262 A1 | 1/2009 | Maeda et al. | |
| 2009/0077525 A1* | 3/2009 | Haffner | G03F 1/36 |
| | | | 716/53 |
| 2011/0173577 A1* | 7/2011 | Chuang | G06F 30/39 |
| | | | 716/54 |
| 2022/0012404 A1* | 1/2022 | Mori | G06F 30/27 |

* cited by examiner

FIG. 17
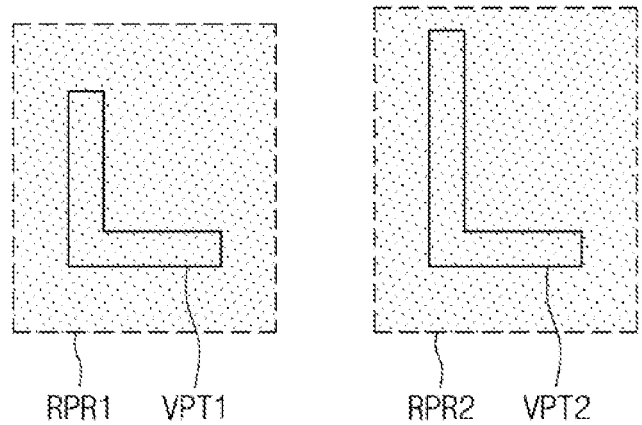
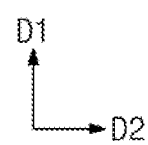
FIG. 18
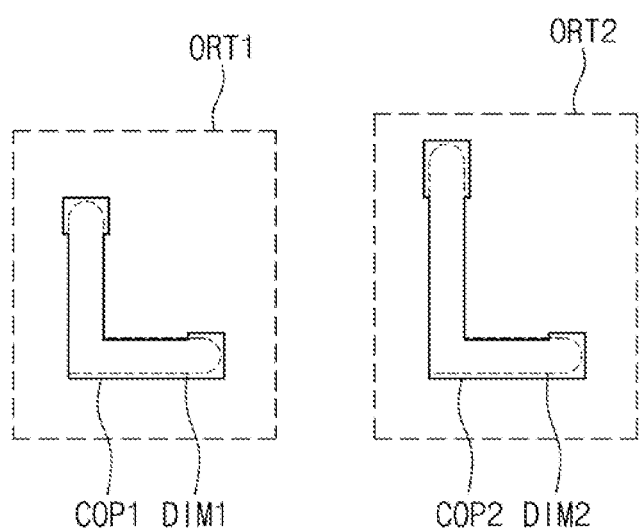
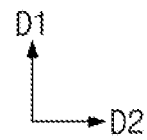

METHOD OF MANUFACTURING A SEMICONDUCTOR DEVICE

CROSS-REFERENCE TO RELATED APPLICATIONS

This U.S. non-provisional patent application claims priority under 35 U.S.C. § 119 to Korean Patent Application No. 10-2021-0033597, filed on Mar. 15, 2021, in the Korean Intellectual Property Office, the entire contents of which are hereby incorporated by reference.

BACKGROUND

1. Field

Embodiments relate to a method of manufacturing a semiconductor device.

2. Description of the Related Art

Due to their small-sized, multifunctional, and/or low-cost characteristics, semiconductor devices are being esteemed as important elements in the electronics industry. The semiconductor devices are classified into a memory device for storing data, a logic device for processing data, and a hybrid device including both of memory and logic elements. As the electronics industry is highly developed, there is an increasing demand for semiconductor devices with improved characteristics. For example, there is an increasing demand for semiconductor devices with high reliability, high performance, and/or multiple functions. To satisfy these technical requirements, complexity and/or integration density of semiconductor devices are being increased.

SUMMARY

In an embodiment, a method of manufacturing a semiconductor device may include designing the semiconductor device, the designing of the semiconductor device including executing a program code in a computer-readable medium by a processor, and performing a photolithography process on a first substrate based on a designed result. The designing of the semiconductor device may include generating a first virtual layout by placing and routing standard cells using a virtual netlist, searching first duplicate pattern regions in the first virtual layout and choosing one of them as a first representative pattern region, performing an OPC operation on the first representative pattern region to obtain a first OPC result, generating an actual layout by placing and routing standard cells using an actual netlist, and performing an OPC operation on the actual layout. The performing of the OPC operation on the actual layout may include searching a first pattern region, which is the same as the first representative pattern region, in the actual layout, and applying the first OPC result to the first pattern region. The performing of the photolithography process may include forming a first photoresist pattern on the first substrate using a first photomask manufactured based on the actual layout, to which the OPC operation is applied.

In an embodiment, a method of manufacturing a semiconductor device may include generating a first virtual layout by placing and routing standard cells using a virtual netlist, searching first duplicate pattern regions in the first virtual layout and choosing one of them as a first representative pattern region, generating a second virtual layout by changing a shape of a pattern in remaining ones of the first duplicate pattern regions, except the first representative pattern region, searching second duplicate pattern regions in the second virtual layout and choosing one of them as a second representative pattern region, performing an OPC operation on the first and second representative pattern regions to obtain a first OPC result and a second OPC result, respectively, performing an OPC operation on an actual layout using the first and second OPC results, and forming a photoresist pattern on a substrate, using a photomask manufactured based on the actual layout, to which the OPC operation is applied.

BRIEF DESCRIPTION OF THE DRAWINGS

Features will become apparent to those of skill in the art by describing in detail example embodiments with reference to the attached drawings in which:

FIGS. 10 to 18 are plan views illustrating layouts in the designing method of FIG. 9, according to an example embodiment.

FIG. 19 is a plan view illustrating a photomask, and FIG. 20 is a conceptual diagram illustrating a process of forming photoresist patterns on a substrate using the photomask of FIG. 19.

DETAILED DESCRIPTION

Figure 1:
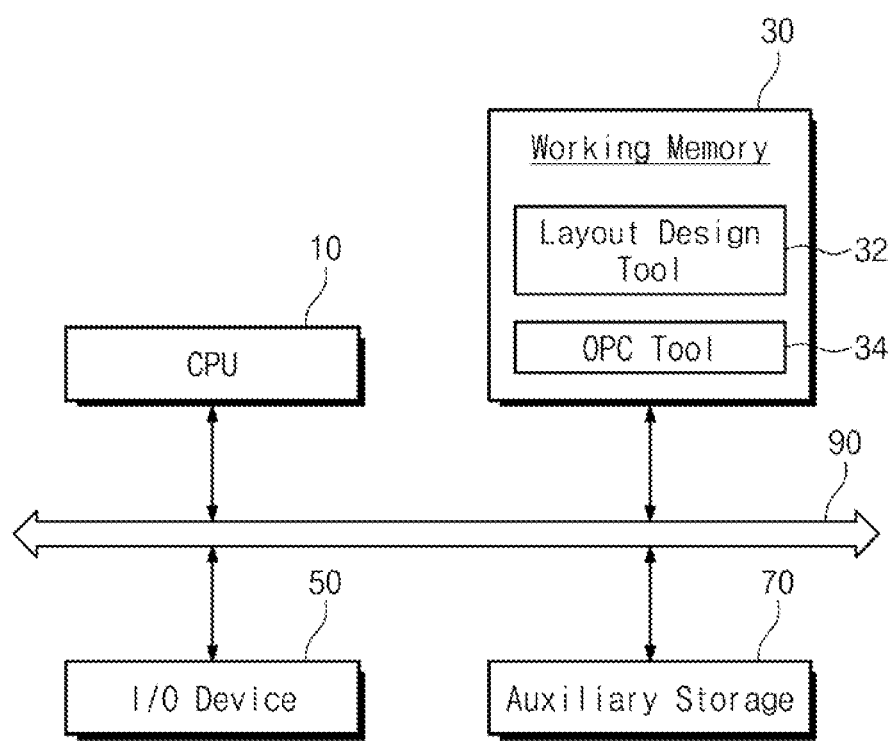
FIG. 1 is a block diagram illustrating a computer system for performing a semiconductor design process, according to an example embodiment.

FIG. 1 is a block diagram illustrating a computer system for performing a semiconductor design process, according to an example embodiment.

Referring to FIG. 1, a computer system may include a central processing unit (CPU) 10, a working memory 30, an input-output device 50, and an auxiliary storage 70. The computer system may be a customized system for performing a layout design process according to an example embodiment. Furthermore, the computer system may include a computing system configured to execute various design and check simulation programs.

The CPU 10 may be configured to run a variety of software programs, such as application programs, operating systems, and device drivers. For example, the CPU 10 may be configured to run an operating system (not shown) loaded on the working memory 30. The CPU 10 may be configured to run various application programs on the operating system. For example, the CPU 10 may be configured to run a layout design tool 32 and/or OPC tool 34 loaded on the working memory 30.

The operating system or application programs may be loaded on the working memory 30. For example, when the computer system starts a booting operation, an OS image (not shown) stored in the auxiliary storage 70 may be loaded on the working memory 30 according to a booting sequence. In the computer system, overall input/output operations may be managed by the operating system. Some application programs, which may be selected by a user or be provided for basic services, may be loaded on the working memory 30. The layout design tool 32 and/or OPC tool 34 may be loaded on the working memory 30, from the auxiliary storage 70.

The layout design tool 32 may provide a function for changing biasing data for specific layout patterns; for example, the layout design tool 32 may be configured to allow the specific layout patterns to have shapes and positions different from those defined by a design rule. The layout design tool 32 may be configured to perform a design rule check (DRC) under the changed condition of the bias data.

The OPC tool 34 may be configured to perform an optical proximity correction (OPC) process on layout data, which is obtained by the layout design tool 32.

The working memory 30 may be one of volatile memory devices (e.g., static random access memory (SRAM) or dynamic random access memory (DRAM) devices) or non-volatile memory devices (e.g., PRAM, MRAM, ReRAM, FRAM, NOR FLASH memory devices).

The input-output device 50 may be configured to control user input and output operations of user interface devices. For example, the input-output device 50 may include a keyboard or a monitor, allowing a designer to input relevant information. By using the input-output device 50, the designer may receive information on several regions or data paths, to which adjusted operating characteristics will be applied, of a semiconductor device. The input-output device 50 may be configured to display a progress status or a process result of the OPC tool 34.

The auxiliary storage 70 may serve as a storage medium for the computer system. The auxiliary storage 70 may be configured to store application programs, an OS image, and various data. The auxiliary storage 70 may be provided in the form of one of memory cards (e.g., MMC, eMMC, SD, MicroSD, and so forth) or a hard disk drive (HDD). The auxiliary storage 70 may include a NAND FLASH memory device with a large memory capacity. In another implementation, the auxiliary storage 70 may include one or more of next-generation nonvolatile memory devices (e.g., PRAM, MRAM, ReRAM, or FRAM) or NOR FLASH memory devices.

A system interconnector 90 may serve as a system bus for realizing a network in the computer system. The CPU 10, the working memory 30, the input-output device 50, and the auxiliary storage 70 may be electrically connected to each other through the system interconnector 90, and thus, data may be exchanged therebetween. The system interconnector 90 may include an additional element for increasing efficiency in data communication.

Figure 2:
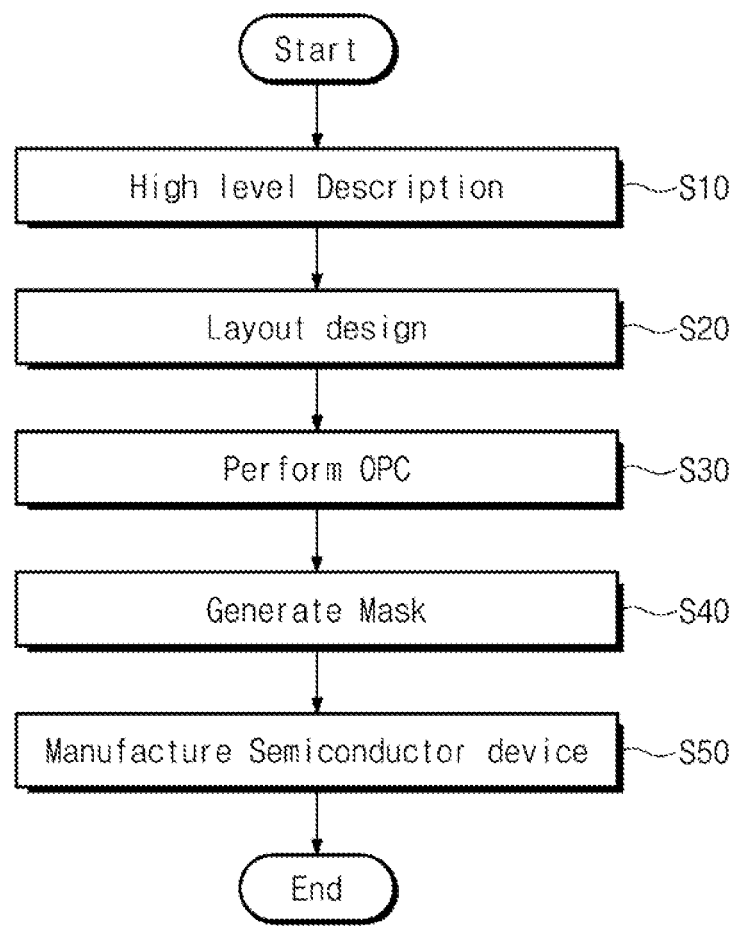
FIG. 2 is a flow chart illustrating a method of designing and manufacturing a semiconductor device, according to an example embodiment.

FIG. 2 is a flow chart illustrating a method of designing and fabricating a semiconductor device, according to an example embodiment.

Referring to FIG. 2, a high-level design process for a semiconductor integrated circuit may be performed using the computer system described with reference to FIG. 1 (in S10). For example, in the high-level design process, an integrated circuit to be designed may be described in terms of high-level computer language (e.g., C language). Circuits designed by the high-level design process may be more concretely described by a register transfer level (RTL) coding or a simulation. Codes generated by the RTL coding may be converted into a netlist, and the results may be combined with each other to wholly describe a semiconductor device. The combined schematic circuit may be verified by a simulation tool. An adjusting operation may be further performed, in consideration of a result of the verification operation.

A layout design process may be performed to realize a logically complete form of the semiconductor integrated circuit on a silicon wafer (in S20). For example, the layout design process may be performed based on the schematic circuit prepared in the high-level design process or the corresponding netlist. The layout design process may include a routing operation of placing and connecting various standard cells that are provided from a cell library, based on a predetermined design rule.

The cell library may contain information on operation, speed, and power consumption of cells. A cell library for representing a layout of a circuit in a gate level may be defined in or by the layout design tool. The layout may be prepared to define or describe shapes, positions, or dimensions of patterns constituting transistors and metal interconnection lines, which will be actually formed on a silicon wafer. For example, in order to actually form an inverter circuit on a silicon wafer, a layout for patterns (e.g., PMOS, NMOS, N-WELL, gate electrodes, and metal interconnection lines thereon) may be prepared or drawn. For this, one or more of inverters defined in the cell library may be selected.

A routing operation of connecting the selected cells to each other may be performed. For example, the routing operation may be performed on the selected and placed standard cells to connect them to upper interconnection lines.

The afore-described operations may be automatically or manually performed in the layout design tool 32. An operation of placing the standard cells and establishing routing structures thereto may be performed by an additional Place & Routing tool.

After the routing operation, a verification operation may be performed on the layout to check whether there is a portion violating the given design rule. The verification operation may include evaluating verification items, such as a design rule check (DRC), an electrical rule check (ERC), and a layout vs schematic (LVS). The evaluating of the DRC item may be performed to evaluate whether the layout meets the given design rule. The evaluating of the ERC item may be performed to evaluate whether there is an issue of electrical disconnection in the layout. The evaluating of the LVS item may be performed to evaluate whether the layout is prepared to coincide with the gate-level netlist.

An optical proximity correction (OPC) operation may be performed (in S30). The OPC operation may be performed to correct optical proximity effects, which may occur when a photolithography process is performed on a silicon wafer using a photomask manufactured based on the layout. The optical proximity effect may be an unintended optical effect (such as refraction or diffraction) which may occur in the exposing process using the photomask manufactured based on the layout. In the OPC operation, the layout may be modified so as to produce a reduced difference in shape between designed patterns and actually-formed patterns, which may be caused by the optical proximity effects. As a result of the OPC operation, the shapes and positions of patterns in the designed layout may be changed or biased. The OPC operation may be performed using the OPC tool 34. The OPC operation will be described in more detail with reference to FIGS. 3 to 8.

A photomask may be manufactured, based on the layout modified by the OPC operation (in S40). For example, the photomask may be manufactured by patterning a chrome layer provided on a glass substrate, using the layout pattern data.

The photomask manufactured may be used to manufacture a semiconductor device (in S50). In the actual fabricating process, the exposing and etching operations may be repeatedly performed, and thus, patterns defined in the layout design process may be sequentially formed on a semiconductor substrate.

Figure 3:
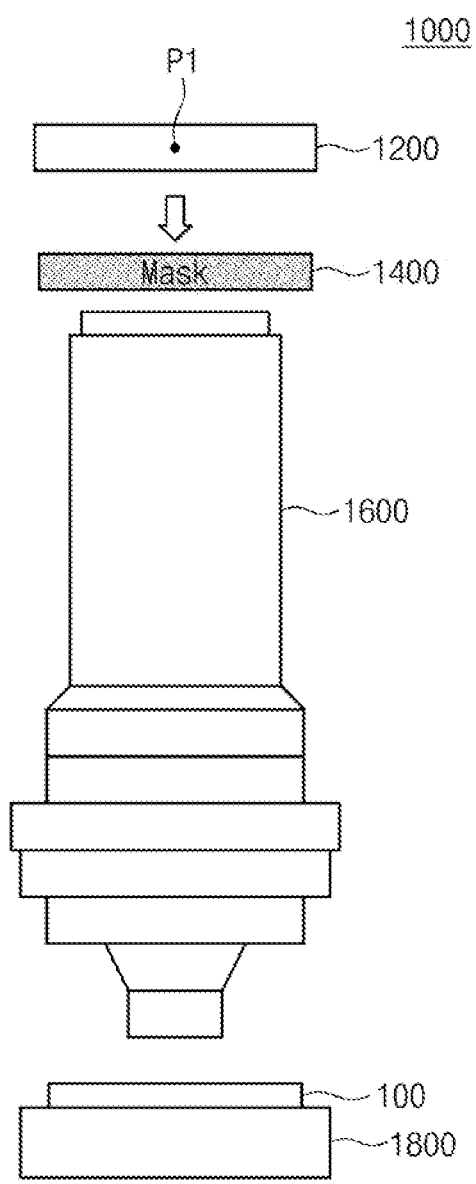
FIG. 3 is a conceptual diagram illustrating a photolithography system, in which a photomask according to an example embodiment is used.

FIG. 3 is a schematic diagram illustrating a photolithography system, in which a photomask according to an example embodiment is used.

Referring to FIG. 3, a photolithography system 1000 may include a light source 1200, a photomask 1400, a reduction projection apparatus 1600, and a substrate stage 1800. Although not illustrated in FIG. 3, some additional elements may be provided in the photolithography system 1000. For example, the photolithography system 1000 may further include a sensor for measuring a height and a slope of a top surface of a substrate 100.

The light source 1200 may be configured to emit light. The light emitted from the light source 1200 may be incident into the photomask 1400. To control a focal length, a lens may be provided between the light source 1200 and the photomask 1400. The light source 1200 may be configured to emit an ultraviolet light; for example, the light source 1200 may be a KrF light source (at 234 nm), an ArF light source (at 193 nm), or an extreme ultraviolet (EUV) light source. The light source 1200 may be the EUV light source. The light source 1200 may include a single point light source P1. The light source 1200 may be configured to have a plurality of point light sources.

The photomask 1400 may include image patterns, which are used to transcribe or print the designed layout onto the substrate 100. The image patterns may be formed, based on layout patterns, which are prepared through layout design and OPC operations described above. The image patterns may be defined by transparent and opaque regions formed on the photomask 1400. The transparent region may be formed by etching the opaque metal layer (e.g., the chrome layer) that is provided on the photomask 1400. The transparent region may be configured to allow light, which is incident from the light source 1200, to propagate toward the substrate 100. By contrast, the opaque region may be configured using the metal layer to prevent the light from propagating toward the substrate 100.

The light passing through the transparent region of the photomask 1400 may be incident into a photoresist layer, which is formed on the substrate 100, through the reduction projection apparatus 1600, and as a result, photoresist patterns may be formed on the substrate 100. The photoresist patterns may have shapes corresponding to the image patterns of the photomask 1400. Thus, by using the reduction projection apparatus 1600, it may be possible to form the photoresist patterns, whose shapes are defined by the image patterns of the photomask 1400, on the substrate 100.

The substrate stage 1800 may be configured to support the substrate 100. The substrate 100 may include, for example, a silicon wafer. The reduction projection apparatus 1600 may include an aperture. The aperture may be used to control a depth of focus, when the ultraviolet light emitted from the light source 1200 is incident onto the substrate 100. As an example, the aperture may include a dipole or quadruple aperture. The reduction projection apparatus 1600 may further include a lens for controlling a focal length.

As an integration density of a semiconductor device increases, a distance between the image patterns of the photomask 1400 may be reduced, thereby causing a proximity issue such as undesired interference and diffraction. As a result of the proximity issue, the photoresist patterns formed on the substrate 100 may have distorted shapes (i.e., different from those of the image patterns of the photomask 1400). The distortion of the photoresist patterns may lead to malfunction of an electronic device or circuit to be formed on the substrate 100.

A resolution enhancement technology may be used to prevent the distortion of the photoresist patterns. An OPC technology, which is used in the operation S30 of FIG. 2, may be an example of the resolution enhancement technology. According to the OPC technology, the optical distortion issue, which is caused by interference and diffraction, may be quantitatively predicted by a simulation process using an OPC model. The designed layout may be corrected or biased, based on the predicted result. Based on the corrected layout, image patterns may be formed on the photomask 1400, and in the case where the photomask 1400 is manufactured by this method, the photoresist patterns may be formed in desired shapes on the substrate 100.

A layout of a semiconductor device may include a plurality of layers. The OPC operation may be performed to correct the layout for each of the layers. Thus, the OPC operation may be independently performed on each of the plurality of layers. A semiconductor device may be fabricated by forming the plurality of layers on a substrate through a semiconductor process. As an example, a semiconductor device may include a plurality of stacked metal layers constituting a specific circuit.

Figure 4:
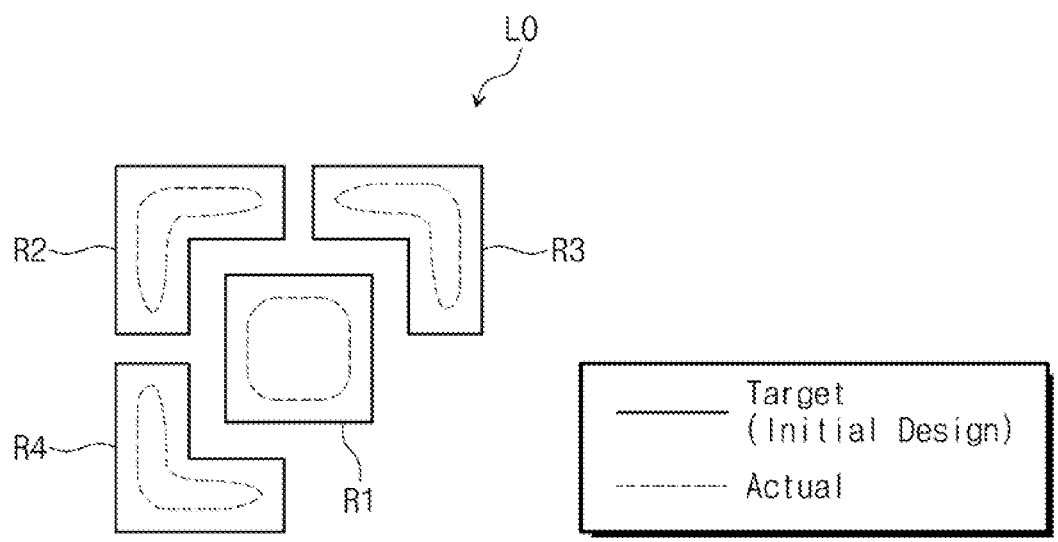
FIG. 4 is a conceptual diagram illustrating a layout according to an example embodiment.

FIG. 4 is a conceptual diagram illustrating a layout according to an example embodiment. In FIG. 4, a solid line depicts target patterns that are desired to be formed on the substrate 100, and a dotted line depicts actual patterns that are actually formed on the substrate 100.

A designed layout LO may include first to fourth circuit patterns R1, R2, R3, and R4. It will be understood that FIG. 4 illustrates an example of a shape of the designed layout LO, which may be varied. The designed layout LO may be provided as an initial design layout. The first to fourth circuit patterns R1, R2, R3, and R4, which are depicted by the solid lines in FIG. 4, may illustrate target patterns that are desired to be formed on the substrate 100.

As described above, owing to the optical distortion issue caused by interference and diffraction, photoresist patterns on the substrate 100 may have shapes different from those in the designed layout LO. For example, even when the image patterns of the photomask 1400 are formed to have shapes depicted by the solid lines of FIG. 4, the first to fourth circuit patterns R1, R2, R3, and R4 to be formed on the substrate 100 may have distorted shapes that are depicted by the dotted lines of FIG. 4. In this case, a circuit formed on the substrate 100 may be abnormally formed.

An OPC operation may be performed to prevent the distortion of the patterns. For example, to reduce a difference between the actual pattern (depicted by the dotted line of FIG. 4) and the target pattern (depicted by the solid line of FIG. 4), the designed layout LO may be biased through the OPC operation. The image patterns of the photomask 1400 may be formed based on the biased layout. In the case where the photomask 1400 manufactured through this process is used for a photolithography process, the actual patterns may be formed on the substrate 100 to have substantially the same shapes as those of the first to fourth circuit patterns R1, R2, R3, and R4 defined in the designed layout LO.

Figure 5:
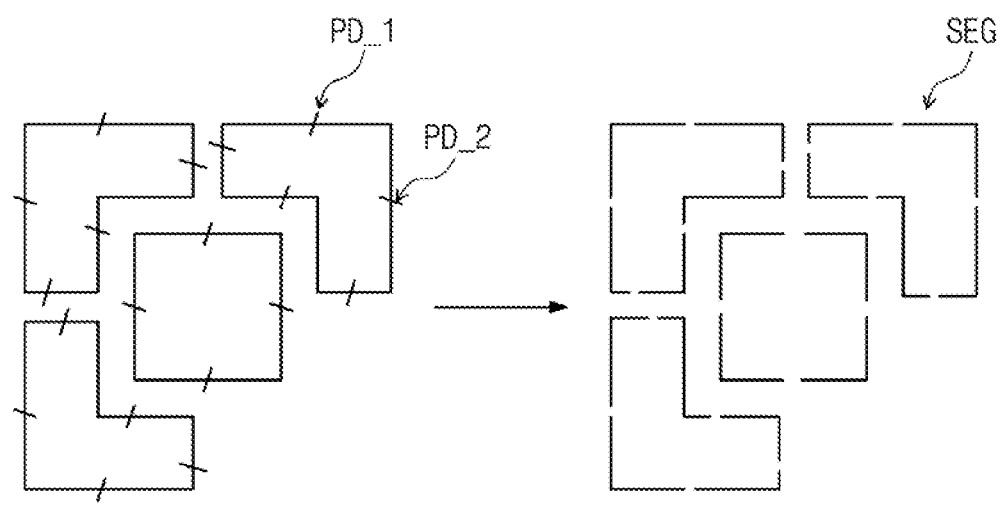
FIG. 5 is a conceptual diagram illustrating a process of dividing a contour of a designed layout of FIG. 4 into a plurality of segments, as a part of an optical proximity correction operation.

FIG. 5 is a conceptual diagram illustrating a method of dividing a contour of a designed layout of FIG. 4 into a plurality of segments, which is performed as a part of the OPC operation.

Referring to FIG. 5, a plurality of division points may be set on a contour of a designed layout. As an example, a first division point PD_1 and a second division point PD_2 may be set on the contour of the designed layout. One segment SEG may be defined by the first division point PD_1 and the second division point PD_2. The contour of the designed layout may be divided into a plurality of segments in a similar manner, based on the division points.

In the present specification, the term "division" may not mean a physical division. Furthermore, although in FIG. 5, a plurality of segments are illustrated as if they were physically spaced apart from each other, FIG. 5 is just a schematic diagram that is presented for the purpose of providing better understanding.

In the OPC operation, each of the divided segments SEG may be a unit object to which the biasing can be applied. Each of the divided segments SEG may be independently biased. For example, one of the segments SEG may be biased in one of a first direction (e.g., a positive or outward direction) and a second direction (e.g., a negative or inward direction), independent of the others of the segments SEG. Each of the divided segments SEG may be biased to reduce a difference in shape or size between the actual and target patterns. The biasing of the divided segments SEG may be performed by the OPC tool 34 of FIG. 1.

Figure 6:
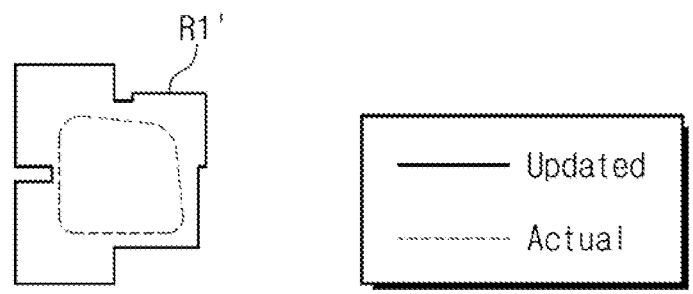
FIG. 6 is a conceptual diagram illustrating a layout corrected by the optical proximity correction operation of FIG. 5.

An example of a corrected layout, which is obtained based on the biased segments, is illustrated in FIG. 6.

FIG. 6 is a conceptual diagram illustrating a layout corrected by the OPC operation of FIG. 5.

Referring to FIG. 6, the corrected layout may include a first correction pattern R1' that is corrected from the first circuit pattern R1 of FIG. 4. For convenience in illustration, the second to fourth circuit patterns R2, R3, and R4 of FIG. 4 are omitted from FIG. 6.

As previously described with reference to FIG. 5, the contour of the first circuit pattern R1 of FIG. 4 may be divided into a plurality of segments SEG, and each of the divided segments SEG may be biased. Referring to FIG. 6, each of the segments SEG may be biased in one of the first direction (e.g., the positive or outward direction) and the second direction (e.g., the negative or inward direction). One or more of the segments SEG may not be biased. FIG. 6 show an example of the first correction pattern R1' that is obtained as a result of the biasing.

The dotted line of FIG. 6 depicts an actual pattern, which will be actually formed on the substrate 100 of FIG. 3 when the corrected layout is used. Thus, the dotted line of FIG. 6 depicts a pattern that is predicted through a simulation process using an OPC model. By biasing each of the divided segments SEG, it may be possible to reduce a difference in shape or size between the actual or simulated pattern and the target pattern.

Figure 7:
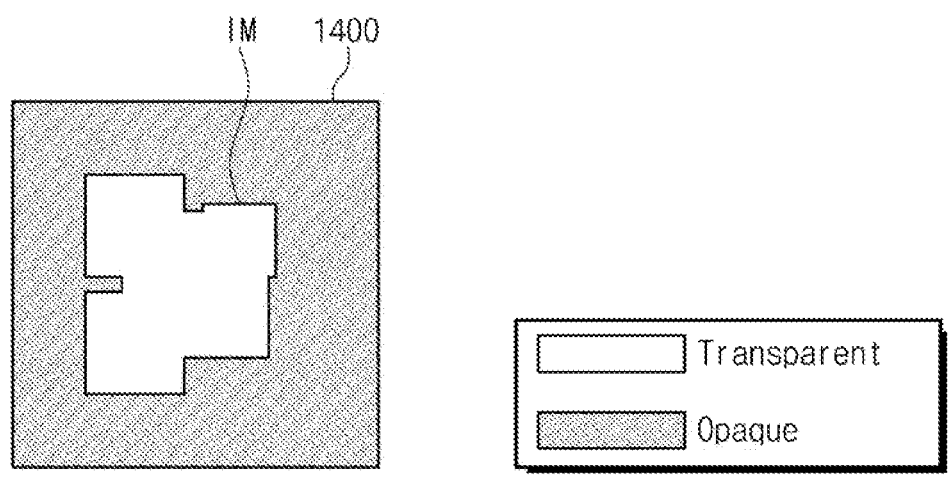
FIG. 7 is a conceptual diagram illustrating a photomask manufactured based on the corrected layout of FIG. 6.

FIG. 7 is a conceptual diagram illustrating a photomask fabricated based on the corrected layout of FIG. 6.

Referring to FIG. 7, the photomask 1400 may include an image pattern IM corresponding to the first correction pattern R1' of FIG. 6. The photomask 1400 may include a transparent region and an opaque region. The opaque region may be configured to prevent light from passing therethrough. The transparent region may be configured to allow light, which is emitted from the light source 1200 of FIG. 3, to pass therethrough. Light passing through the photomask 1400 may be incident into a photoresist layer on the substrate 100 of FIG. 3. For example, in the case where a negative photoresist layer is used for the photolithography process, the image pattern IM may be the transparent region.

Figure 8:
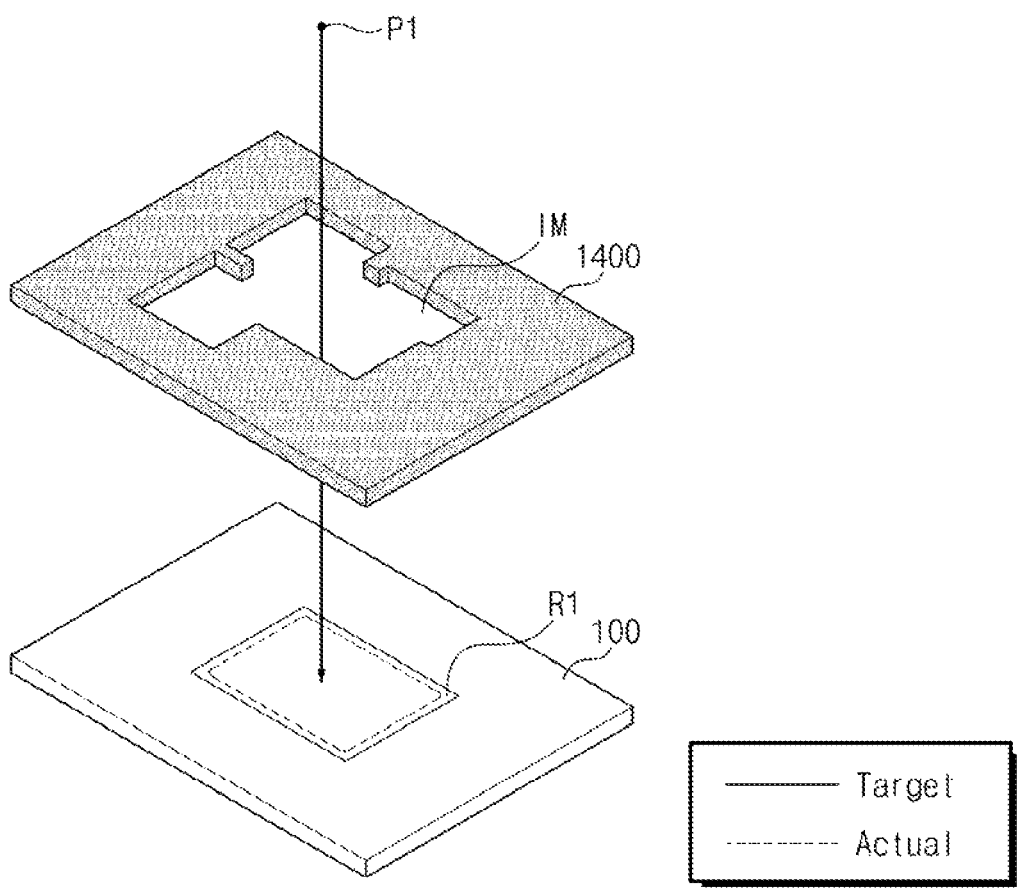
FIG. 8 is a conceptual diagram illustrating a process of printing a circuit pattern on a substrate using the photomask of FIG. 7.

FIG. 8 is a conceptual diagram illustrating a process of printing a circuit pattern on a substrate using the photomask of FIG. 7.

Referring to FIG. 8, a point light source P1 in the light source 1200 of FIG. 3 may be configured to emit light toward the photomask 1400. In an exposure operation, the emitted light may pass through the transparent region of the image pattern IM and then may be incident into the negative photoresist layer on the substrate 100. A region of the negative photoresist layer, which is exposed to the light, may be left, and another region of the negative photoresist layer, which is not exposed to the light, may be removed, in a subsequent developing operation. Accordingly, the first circuit pattern R1 corresponding to the image pattern IM may be formed on the substrate 100.

An actual pattern printed on the substrate 100 may have a shape depicted by the dotted line. The actual pattern may have substantially the same shape and size as those of the target pattern depicted by the solid line. Thus, by using the afore-described OPC operation, it may be possible to reduce a different in shape and size between the actual and target patterns.

Figure 9:
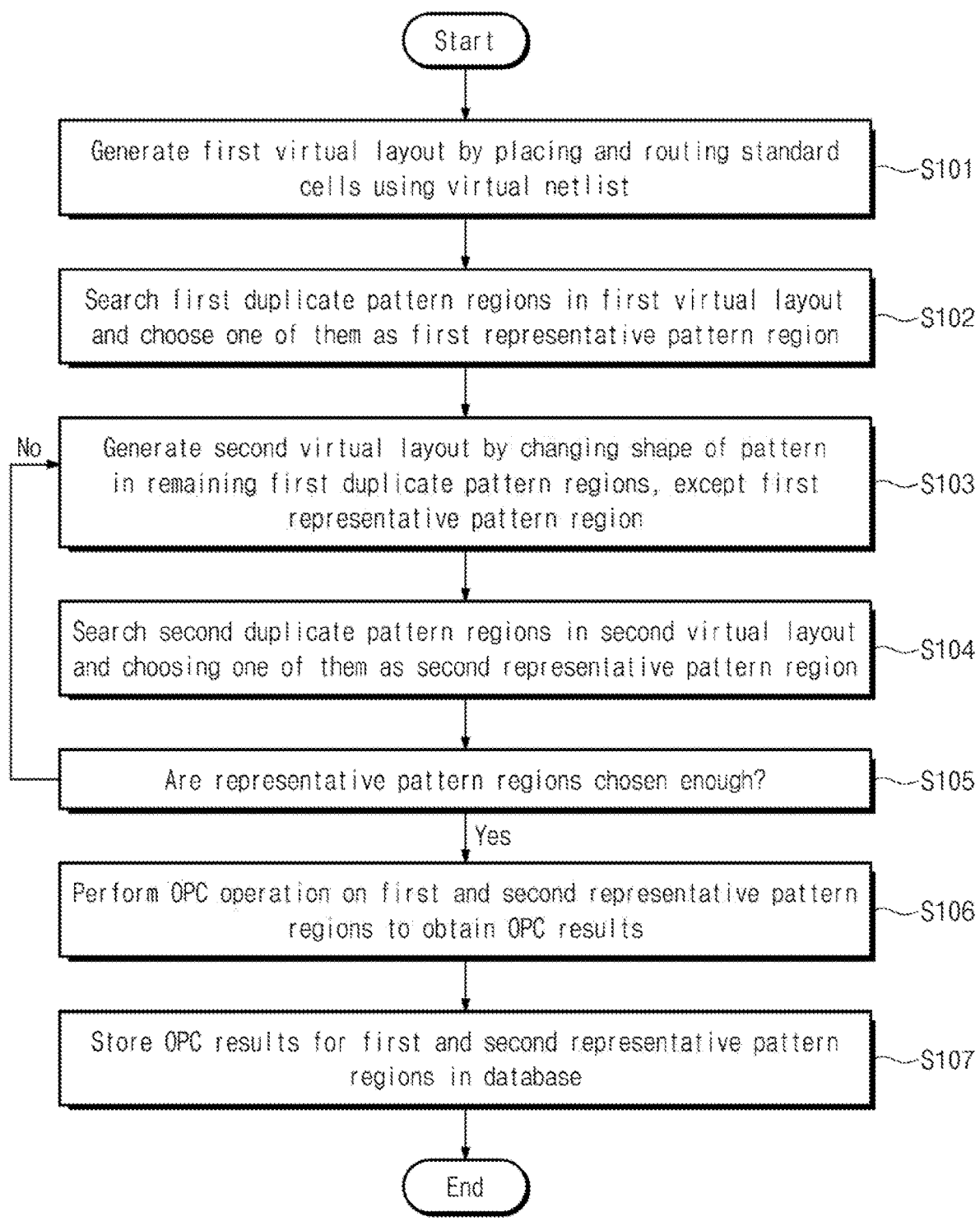
FIG. 9 is a flow chart illustrating a method of designing a semiconductor device according to an example embodiment.

FIG. 9 is a flow chart illustrating a method of designing a semiconductor device according to an example embodiment. FIGS. 10 to 18 are plan views illustrating layouts in the designing method of FIG. 9, according to an example embodiment.

FIG. 9 illustrates a method that includes constructing a database, which is used to improve the accuracy of the OPC process and to reduce an actual time that is required to design and manufacture a semiconductor device.

Figure 10:
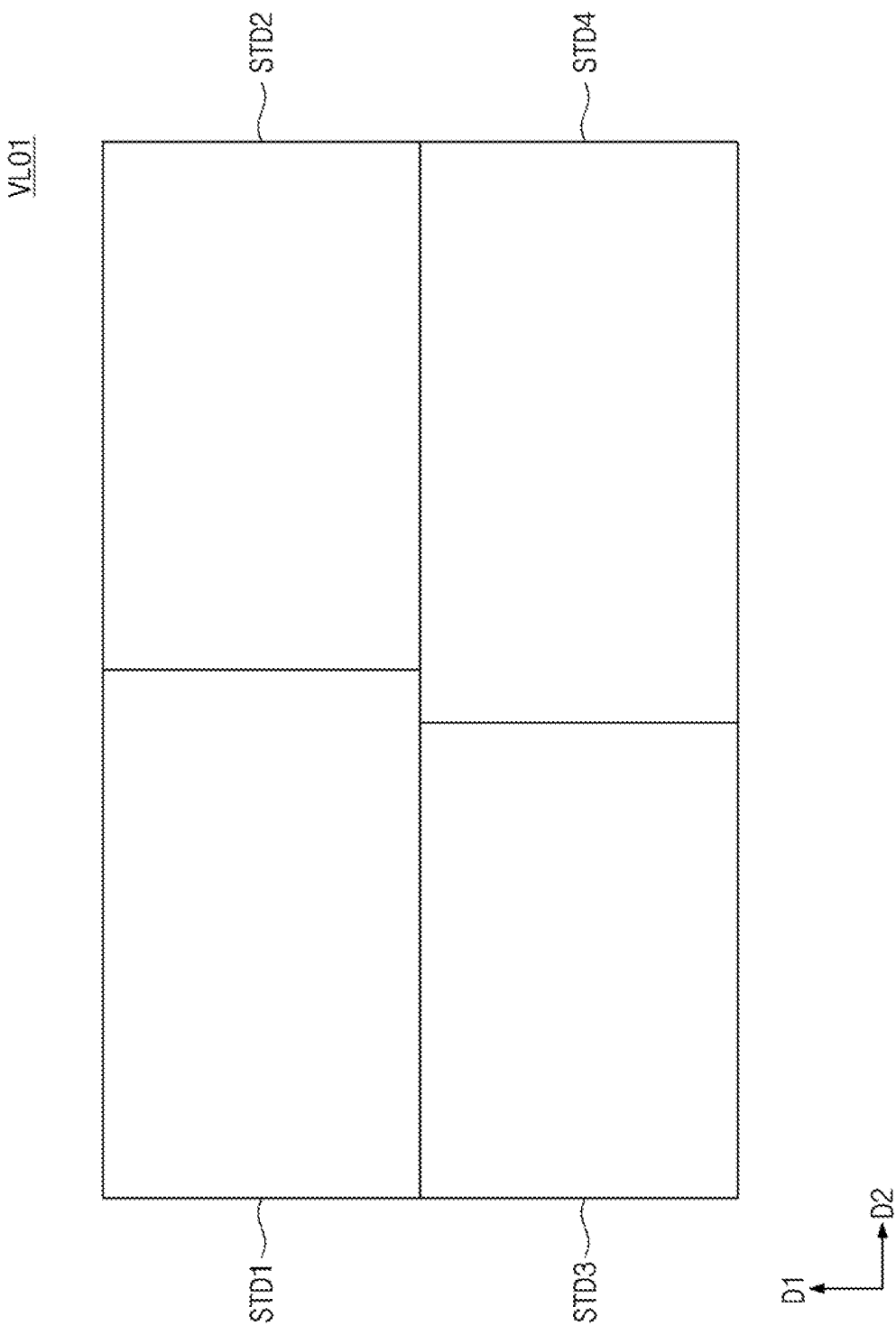

Referring to FIGS. 9 and 10, a first virtual layout VLO1 may be generated by placing standard cells STD1 to STD4 based on a virtual netlist (in S101). The virtual netlist may be prepared in a certain manner of scaling down an actual netlist. The virtual netlist may include a certain schematic circuit.

The standard cells, which are provided from a cell library, may be placed based on the virtual netlist. For example, FIG. 10 illustrates an example in which first to fourth standard cells STD1 to STD4 are placed based on the virtual netlist.

Figure 11:
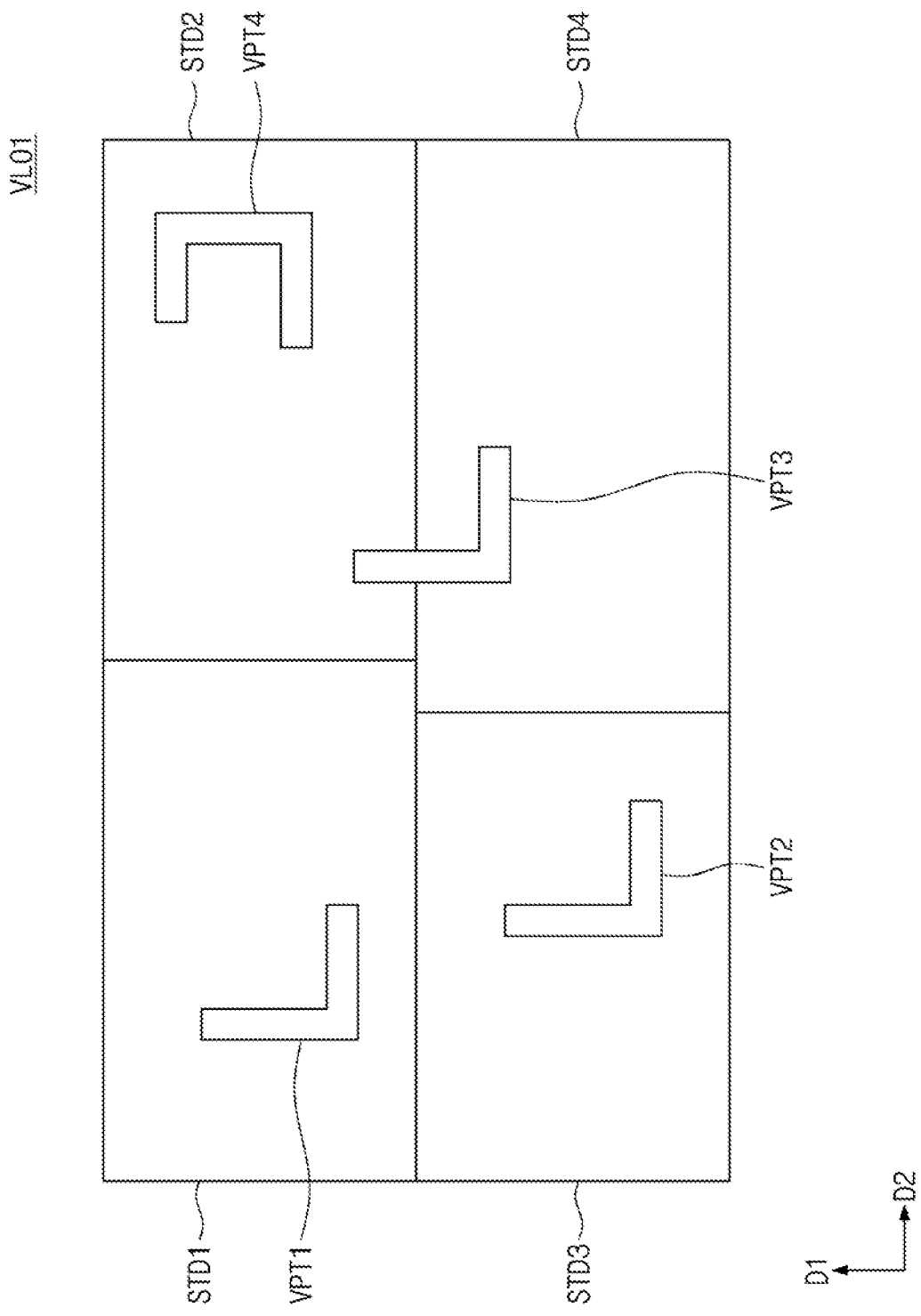

Referring to FIGS. 9 and 11, a routing operation may be performed on the first virtual layout VLO1 (in S101). As a result of the routing operation, virtual interconnection line patterns may be provided on the first virtual layout VLO1. The routing operating may be performed on the ground of the virtual netlist.

First to fourth virtual patterns VPT1 to VPT4 may be provided on the first virtual layout VLO1. The first to fourth virtual patterns VPT1 to VPT4 may constitute one of metal or interconnection layers, which will be formed through a back-end-of-line (BEOL) operation in a semiconductor manufacturing process. For example, the first to fourth virtual patterns VPT1 to VPT4 may correspond to interconnection lines, which are provided in one of a first metal layer M1, a second metal layer M2, a third metal layer M3, and other metal layers thereon (e.g., M4, M5, M6, . . . ).

Each of the first to fourth virtual patterns VPT1 to VPT4 illustrated in FIG. 11 may have a shape that is not a simple line shape. For example, each of the first to fourth virtual patterns VPT1 to VPT4 may include at least one first portion, which is extended in a first direction D1, and at least one second portion, which is extended in a second direction D2.

Figure 12:
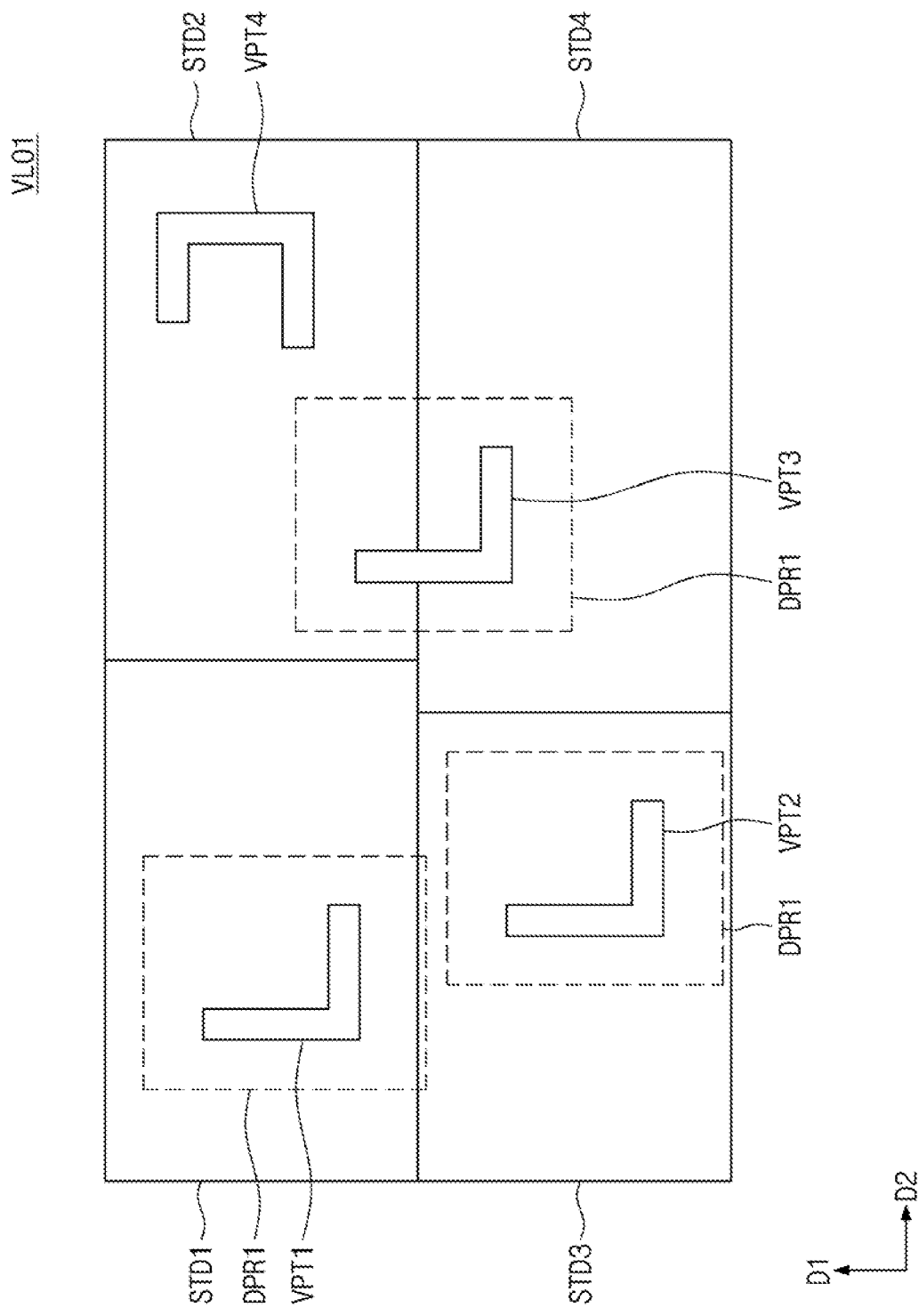

Referring to FIGS. 9 and 12, first duplicate pattern regions DPR1 may be searched in the first virtual layout VLO1 (in S102). For example, the first virtual pattern VPT1, the second virtual pattern VPT2, and the third virtual pattern VPT3 may have the same shape. Thus, the first virtual pattern VPT1 and its neighboring region, the second virtual pattern VPT2 and its neighboring region, and the third virtual pattern VPT3 and its neighboring region may be the same as each other. The first virtual pattern VPT1 and its neighboring region, along with the second virtual pattern VPT2 and its neighboring region and the third virtual pattern VPT3 and its neighboring region, may be defined as the first duplicate pattern regions DPR1.

By contrast, the fourth virtual pattern VPT4 may have a shape different from the first to third virtual patterns VPT1 to VPT3. Thus, the fourth virtual pattern VPT4 and its neighboring region may not be defined as the first duplicate pattern region DPR1.

Figure 13:
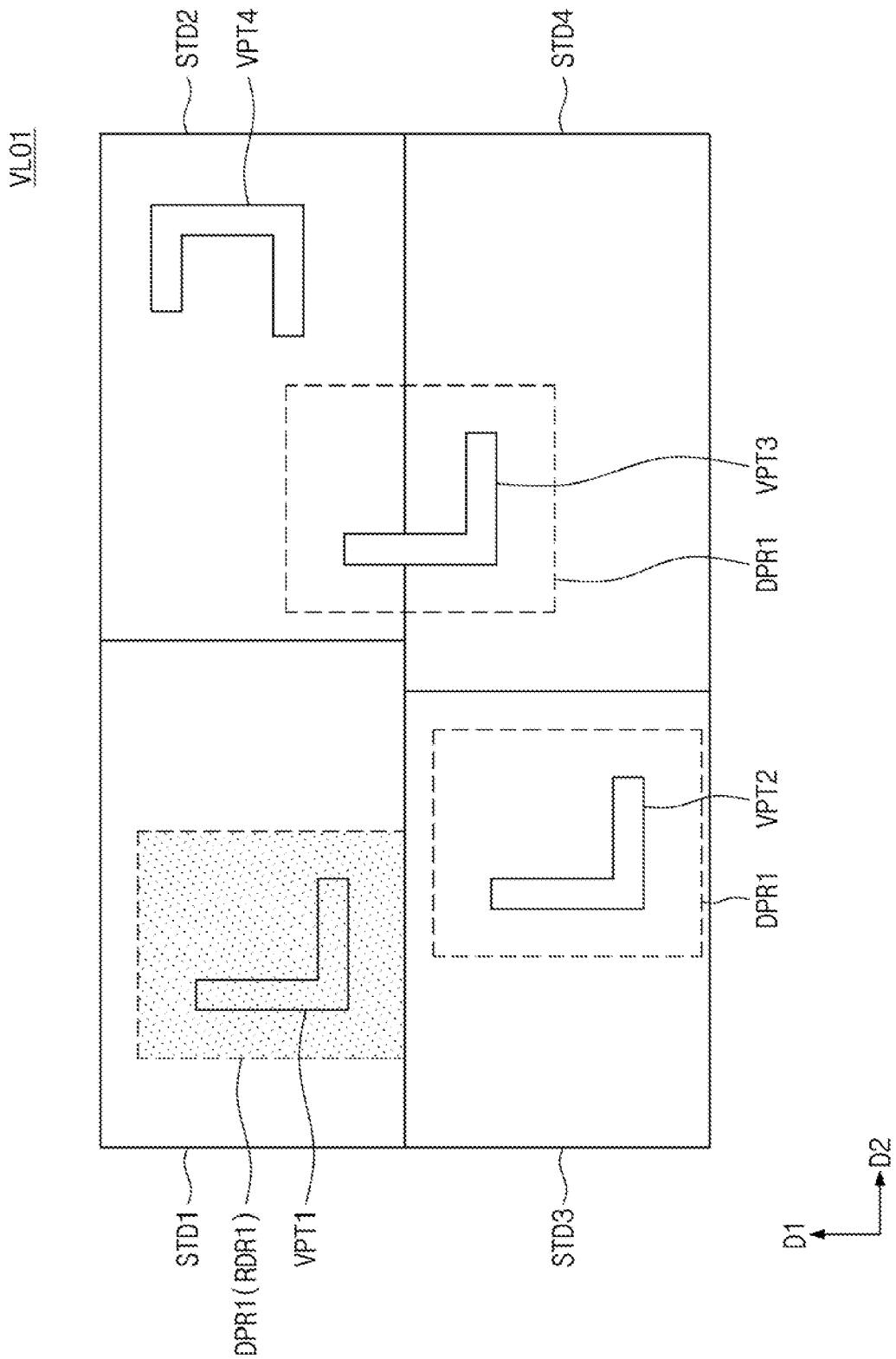

Referring to FIGS. 9 and 13, one of the first duplicate pattern regions DPR1 may be chosen as a first representative pattern region RPR1 (in S102). For example, one of the first duplicate pattern regions DPR1 including the first virtual pattern VPT1 may be chosen as the first representative pattern region RPR1. The first representative pattern region RPR1 may be marked to differentiate it from the others of the first duplicate pattern regions DPR1 (e.g., see the hatched region of FIG. 13).

Figure 14:
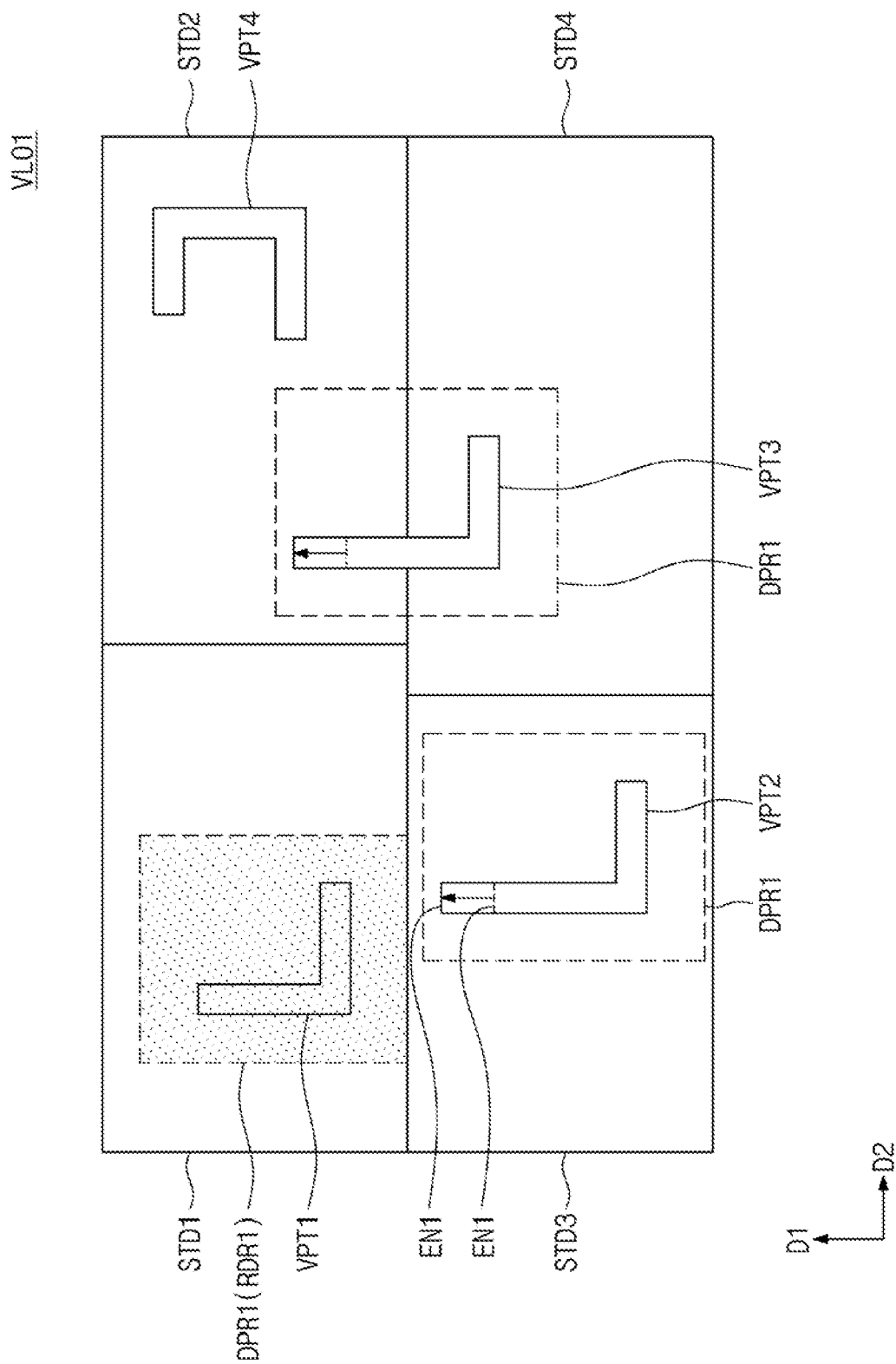

Referring to FIGS. 9 and 14, the shapes of the virtual patterns in the remaining ones of the first duplicate pattern regions DPR1, except the first representative pattern region RPR1, may be changed (in S103). For example, the shapes of the second and third virtual patterns VPT2 and VPT3 in the first duplicate pattern regions DPR1 may be changed. The second virtual pattern VPT2 may be biased to have an end EN1 that is elongated or expanded in the first direction D1. Similarly, the third virtual pattern VPT3 may be biased to have an elongated or expanded end. However, the first virtual patterns VPT1 in the marked first representative pattern region RPR1 may be maintained to its original shape without any change.

Figure 15:
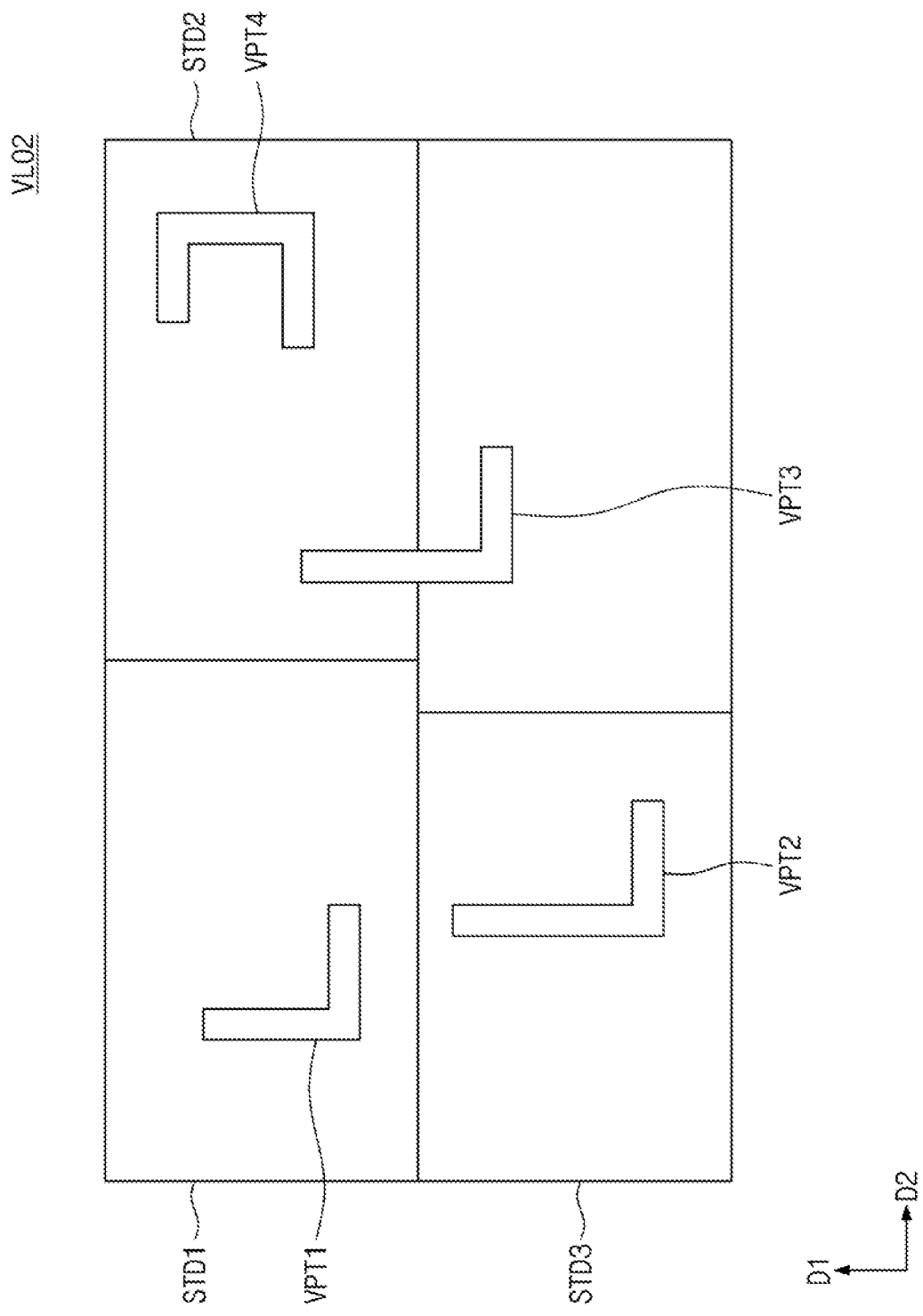

Referring to FIGS. 9 and 15, since the shapes of the second and third virtual patterns VPT2 and VPT3 are changed, a second virtual layout VLO2 different from the first virtual layout VLO1 may be generated (in S103). For example, the shape of the second virtual pattern VPT2 may not be the same as the shape of the first virtual pattern VPT1. The shape of the third virtual pattern VPT3 may not be the same as the shape of the first virtual pattern VPT1. The second and third virtual patterns VPT2 and VPT3 may have the same shape.

Figure 16:
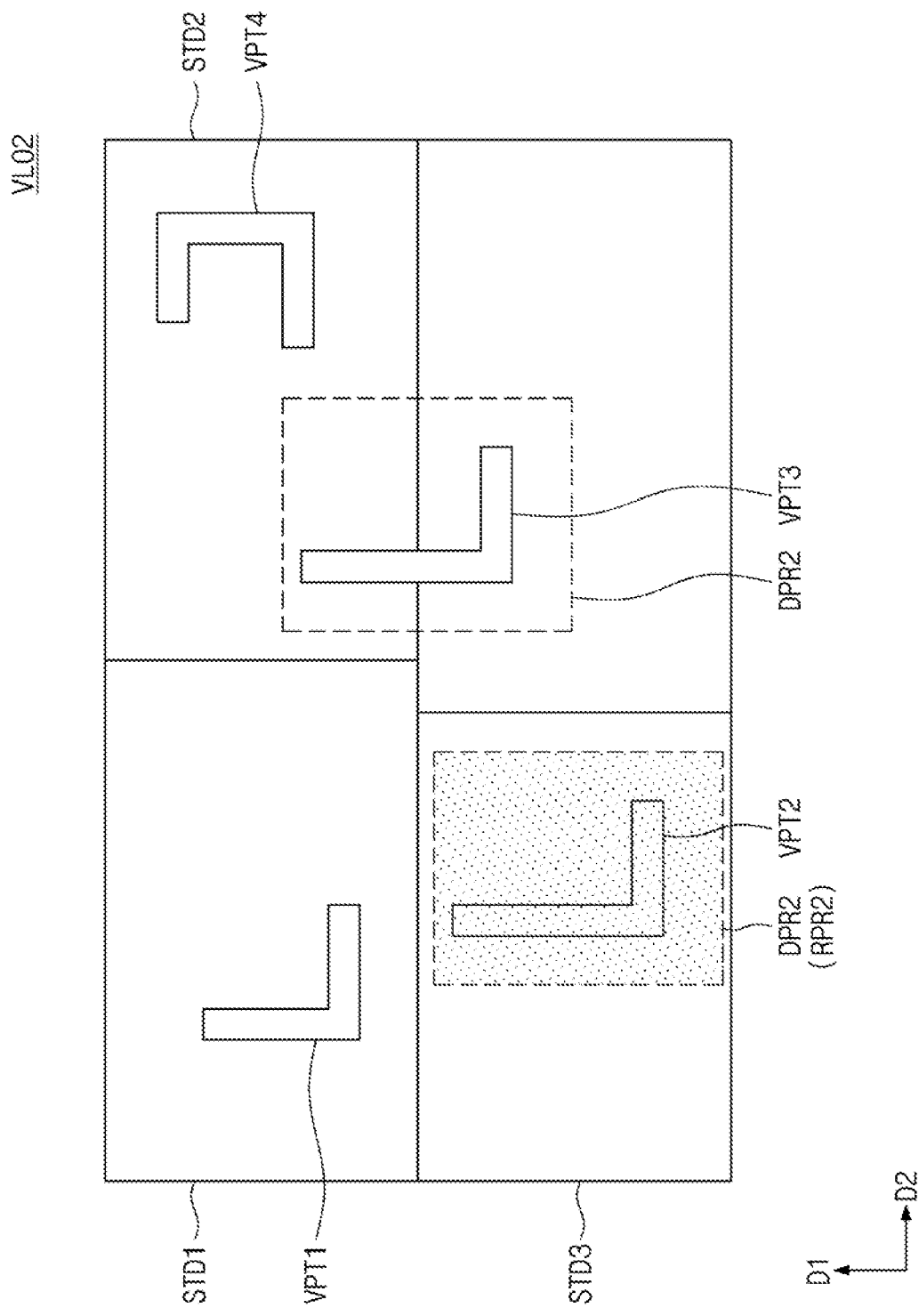

Referring to FIGS. 9 and 16, second duplicate pattern regions DPR2 may be searched in the second virtual layout VLO2 (in S104). For example, the second virtual pattern VPT2 and the third virtual pattern VPT3 may have the same shape as each other. Thus, the second virtual pattern VPT2 and its neighboring region and the third virtual pattern VPT3 and its neighboring region may be the same as each other. The second virtual pattern VPT2 and its neighboring region, along with the third virtual pattern VPT3 and its neighboring region, may be defined as the second duplicate pattern regions DPR2.

One of the second duplicate pattern regions DPR2 may be chosen as a second representative pattern region RPR2 (in S104). For example, one of the second duplicate pattern regions DPR2 including the second virtual pattern VPT2 may be chosen as the second representative pattern region RPR2. The second representative pattern region RPR2 may be marked to differentiate it from the others of the second duplicate pattern regions DPR2 (e.g., see the hatched region of FIG. 16).

Referring to FIGS. 9 and 17, a first representative pattern region PRP1, which is chosen from the first virtual layout VLO1, and a second representative pattern region PRP2, which is chosen from the second virtual layout VLO2, may be collected (in S104). Thus, two or more representative pattern regions may be collected from a virtual layout, which is generated based on a single virtual netlist, by elongating or expanding a line-end of a pattern. For example, two or more representative pattern regions (e.g., RPR1 and RPR2) may be collected from a single representative pattern region (e.g., RPR1).

Referring to FIGS. 9 and 18, OPC results (e.g., a first OPC result ORT1 and a second OPC result ORT2) may be obtained by performing an OPC operation on the collected representative pattern regions (e.g., the first and second representative pattern regions RPR1 and RPR2) respectively (in S106).

For example, a first correction pattern COP1 may be generated by performing the OPC operation on the first virtual pattern VPT1 of the first representative pattern region RPR1. The OPC operation may be performed under a mask rule. The mask rule may be defined as the shortest distance between image patterns, which will be formed in the photomask 1400 of FIG. 3. The first correction pattern COP1 may be generated by selecting the first virtual pattern VPT1 as a target pattern in the OPC operation. The first correction pattern COP1 may have a first simulation image DIM1, which is generated through a simulation process using an OPC model. The first correction pattern COP1 may be generated through the OPC simulation process such that the first simulation image DIM1 matches the target pattern (i.e., the first virtual pattern VPT1) maximally in size and position.

A second correction pattern COP2 may be generated by performing an OPC operation on the second virtual pattern VPT2 of the second representative pattern region RPR2. The second correction pattern COP2 may be generated by selecting the second virtual pattern VPT2 as a target pattern in the OPC operation. The second correction pattern COP2 may have a second simulation image DIM2, which is generated through the simulation process using the OPC model. The second correction pattern COP2 may be generated through the OPC simulation process such that the second simulation image DIM2 matches the target pattern (i.e., the second virtual pattern VPT2) maximally in size and position.

The first OPC result ORT1 for the first representative pattern region RPR1 of FIG. 18 and the second OPC result ORT2 for the second representative pattern region RPR2 may be stored in a database. The first OPC result ORT1 and the second OPC result ORT2, may be used in a design process of an actual semiconductor device, which will be described below.

Figure 19:
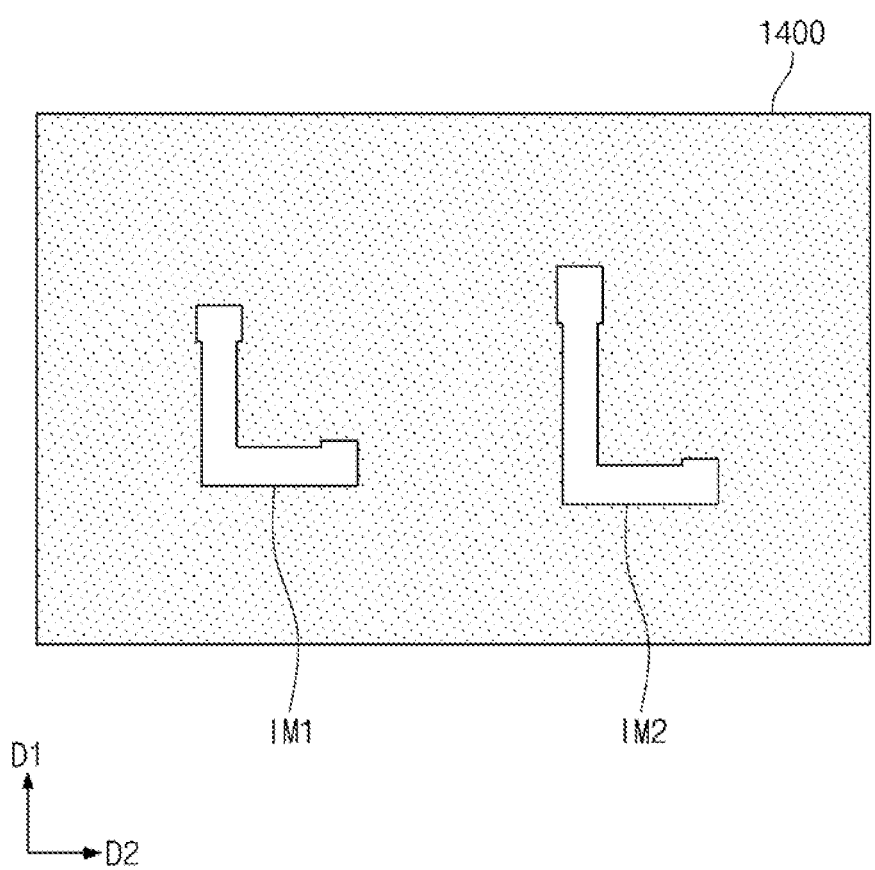
FIGS. 19 and 20 are diagrams illustrating a method of verifying results of an OPC process according to an example embodiment.
Figure 20:
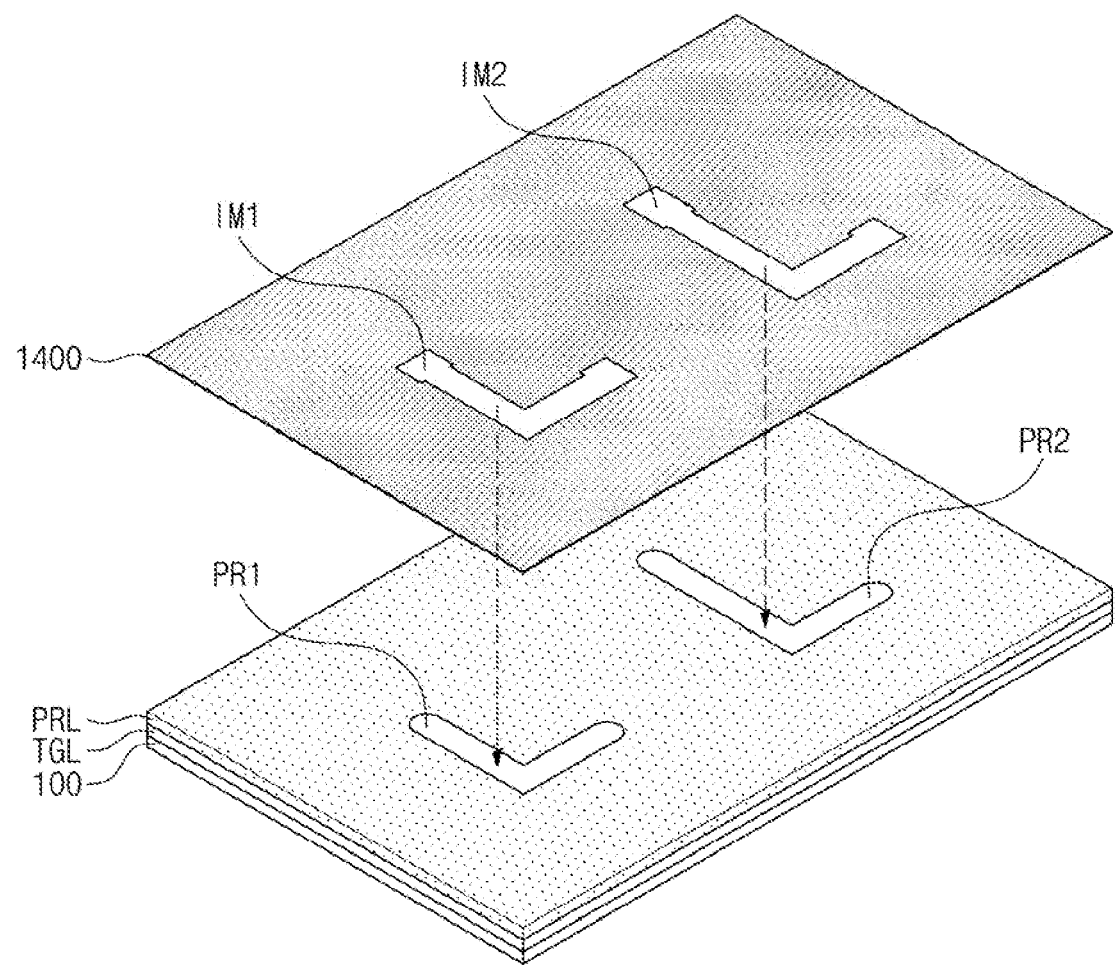

FIGS. 19 and 20 are diagrams illustrating a method of verifying results of an OPC process according to an example embodiment. FIG. 19 is a plan view illustrating a photomask, and FIG. 20 is a conceptual diagram illustrating a process of forming photoresist patterns on a substrate using the photomask of FIG. 19.

Referring to FIG. 19, the photomask 1400 may be manufactured based on the first and second OPC results ORT1 and ORT2 of FIG. 18. The photomask 1400 may include first and second image patterns IM1 and IM2. The first image pattern IM1 may be an image pattern that is formed on the basis of the first correction pattern COP1 of FIG. 18, and the second image pattern IM2 may be an image pattern that is formed on the basis of the second correction pattern COP2 of FIG. 18.

The photomask 1400 may include a transparent region and an opaque region. The opaque region may be configured to prevent light from passing therethrough. By contrast, the transparent region may be configured to allow light, which is emitted from the light source 1200 of FIG. 3, to pass therethrough. Light passing through the photomask 1400 may be incident into a photoresist layer on the substrate 100 of FIG. 3. For example, in the case where a negative photoresist layer is used for a photolithography process, the image patterns IM may be the transparent region of the photomask 1400.

Referring to FIG. 20, the light source 1200 of FIG. 3 may emit light toward the photomask 1400. The emitted light may pass through the transparent regions of the first and second image patterns IM1 and IM2 and then may be incident into a photoresist layer PRL on a substrate SUB (i.e., in the exposure operation). A region of the photoresist layer PRL, which is exposed to the light, may form photoresist patterns. The photoresist patterns may include a first photoresist pattern PR1, which is transcribed by the first image pattern IM1, and a second photoresist pattern PR2, which is transcribed by the second image pattern IM2. The first and second photoresist patterns PR1 and PR2 may be formed to have the same shapes as the first and second simulation images DIM1 and DIM2 previously predicted in the operation of FIG. 18.

According to an example embodiment, by actually applying OPC results, which are obtained through a virtual layout, to a process of forming patterns on the substrate 100 through exposure and developing processes, it may be possible to evaluate the validity of the OPC results. Thus, the accuracy of the OPC operation may be improved. For example, the evaluating of the OPC results may include manufacturing a second photomask using the OPC results, and forming another photoresist pattern on a second substrate through an exposure and develop process using the second photomask FIGS. 21 to 23 are plan views illustrating layouts in the designing method of FIG. 9, according to an example embodiment.

Figure 21:
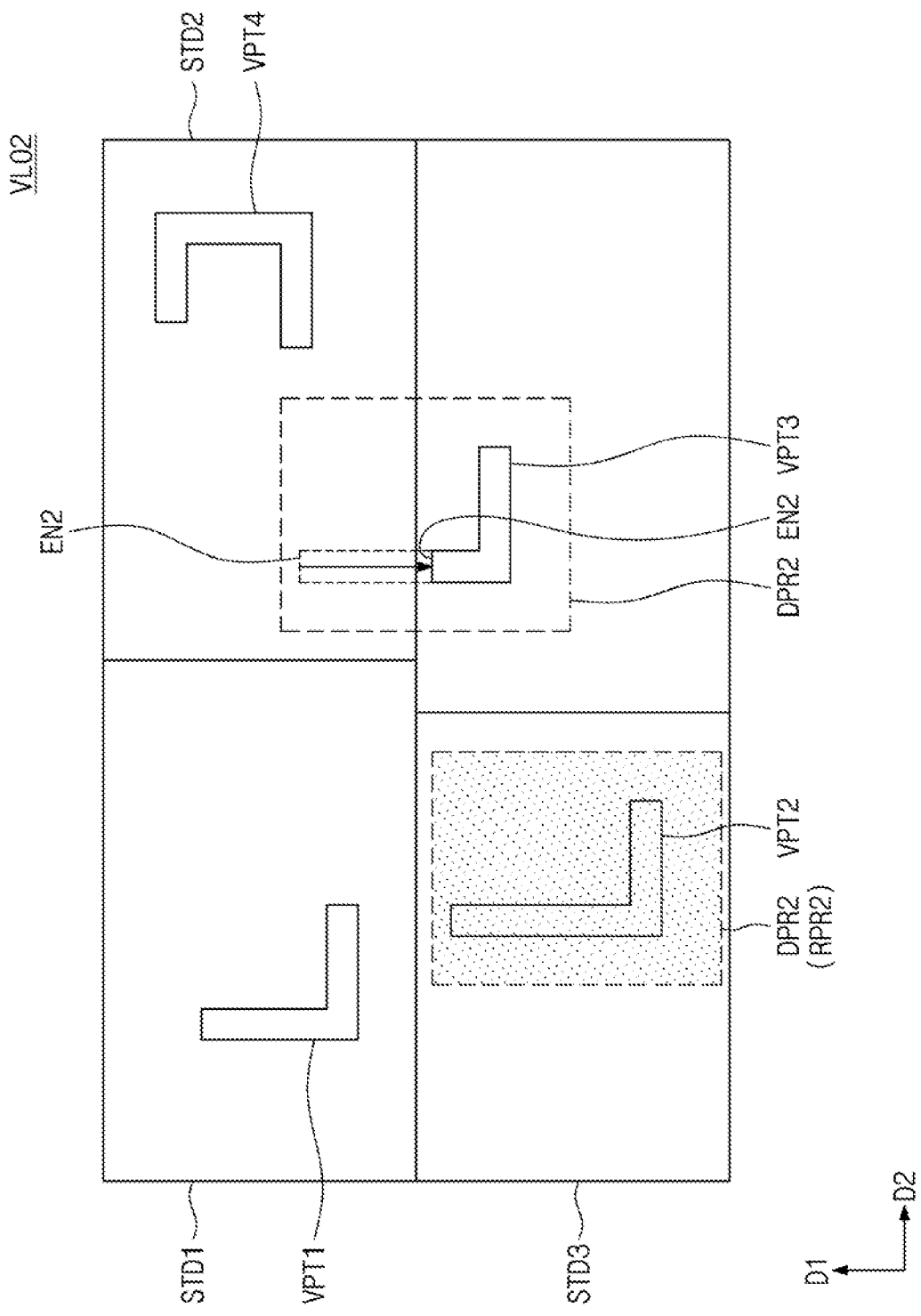
FIGS. 21 to 23 are plan views illustrating layouts in the designing method of FIG. 9, according to an example embodiment.

Referring to FIGS. 9 and 21, if the representative pattern regions RPR1 and RPR2 chosen in the operation of FIG. 17 are not satisfactory (in S105), the operations S103 and S104 of FIG. 9 may be performed again.

In the second virtual layout VLO2 of FIG. 16, the shape of the virtual pattern in the remaining one of the second duplicate pattern regions DPR2, except the second representative pattern region RPR2, may be changed (in S103). For example, the shape of the third virtual pattern VPT3 in the second duplicate pattern region DPR2 may be changed. The third virtual pattern VPT3 may biased to have an end EN2 that is contracted in an opposite direction of the first direction D1. Meanwhile, the second virtual pattern VPT2 in the marked second representative pattern region RPR2 may be maintained to its original shape without any change.

Figure 22:
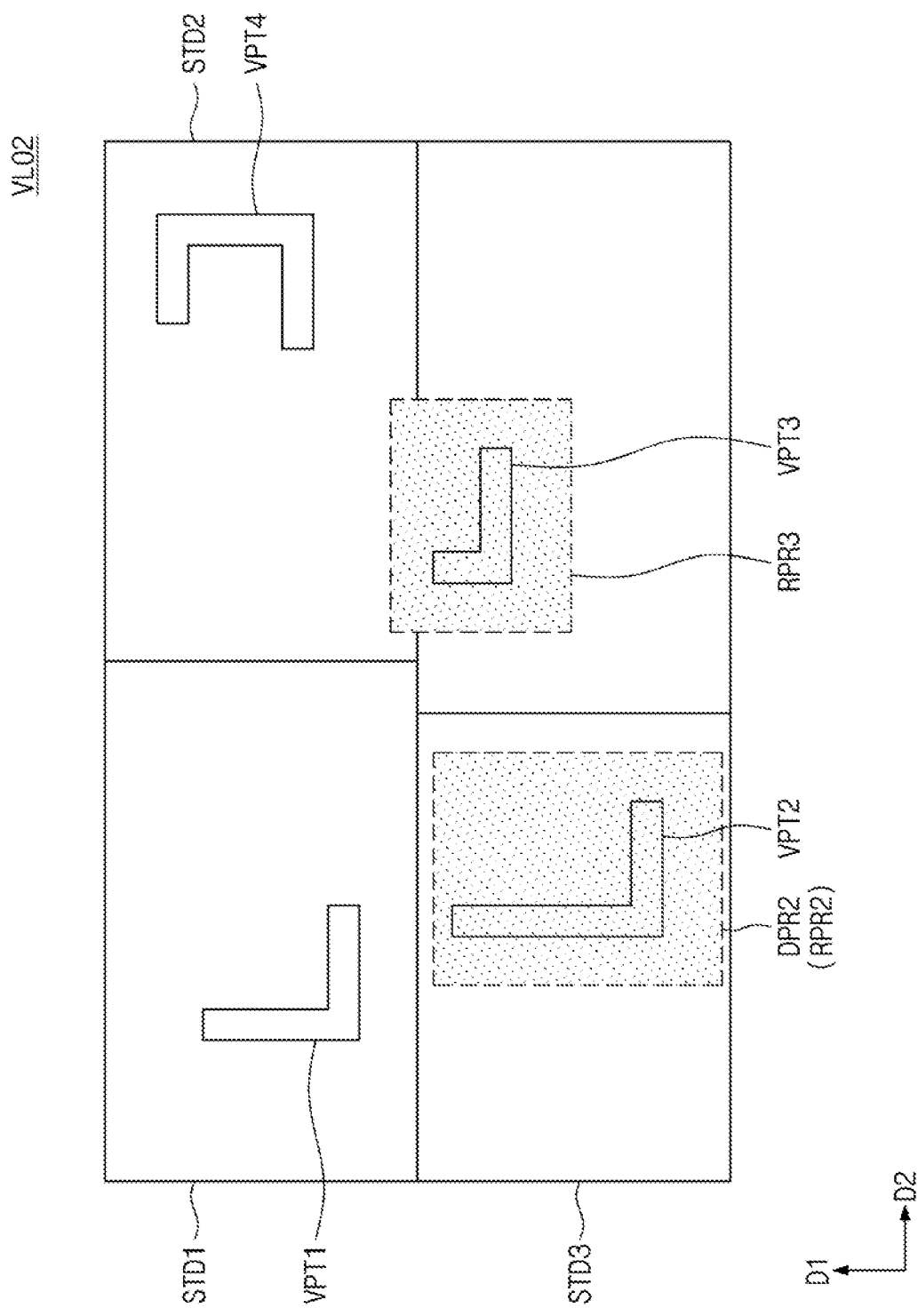
Figure 23:
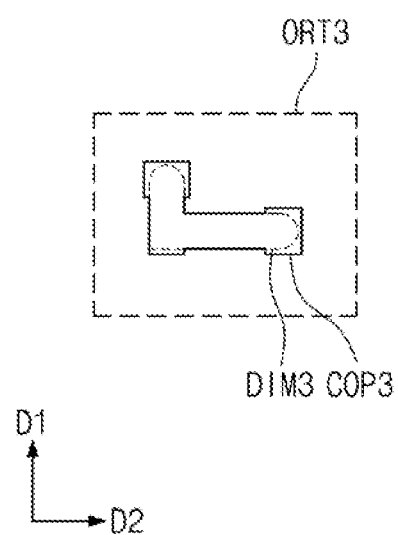

Referring to FIGS. 9 and 22, a third virtual layout VLO3 different from the second virtual layout VLO2 may be generated, because the shape of the third virtual pattern VPT3 is changed (in S103). For example, the shape of the third virtual pattern VPT3 may not be the same as the shape of the first virtual pattern VPT1 as well as the shape of the second virtual pattern VPT2. The third virtual pattern VPT3 and its neighboring region may be chosen as a third representative pattern region RPR3 (in S104).

Referring to FIGS. 9 and 23, the third representative pattern region RPR3, which is chosen from the third virtual layout VLO3, may be additionally collected (in S104). Thus, two or more representative pattern regions may be collected from the virtual layout, which is generated based on the single virtual netlist, by expanding or contracting a line-end of a pattern.

A third OPC result ORT3 may be obtained by performing an OPC operation on the collected third representative pattern region RPR3 (in S106). For example, a third correction pattern COP3 may be generated by performing the OPC operation on the third virtual pattern VPT3 of the third representative pattern region RPR3. The third correction pattern COP3 may be generated by selecting the third virtual pattern VPT3 as a target pattern in the OPC operation. The third correction pattern COP3 may have a third simulation image DIM3, which is generated through a simulation process using an OPC model. The third OPC result ORT3, along with the first and second OPC results ORT1 and ORT2 of FIG. 18 described above, may be stored in a database.

According to an example embodiment, the number of the representative pattern regions and the number of the OPC results may be increased by repeating the operations S103 and S104 of FIG. 9. The operations may be repeated until the number of the representative pattern regions or the number of their types reaches a desired value. As a result, a number of the OPC results, which can be used in a process of actually designing a semiconductor device, may be prepared and may be stored in the form of a database.

The design method of FIG. 9 according to an example embodiment may be performed using the layout design tool 32 and/or the OPC tool 34 of FIG. 1. The layout design tool 32 and/or the OPC tool 34 may be a computer program product, in which a computer-readable program code is stored, or may be a computer program product including a non-transitory computer-usable medium, in which a computer-readable program code is stored. Additionally or alternatively, the layout design tool 32 and/or the OPC tool 34 may be a product that can be downloaded via the internet.

FIGS. 24 to 31 are plan views illustrating layouts in the designing method of FIG. 9, according to another example embodiment.

Figure 24:
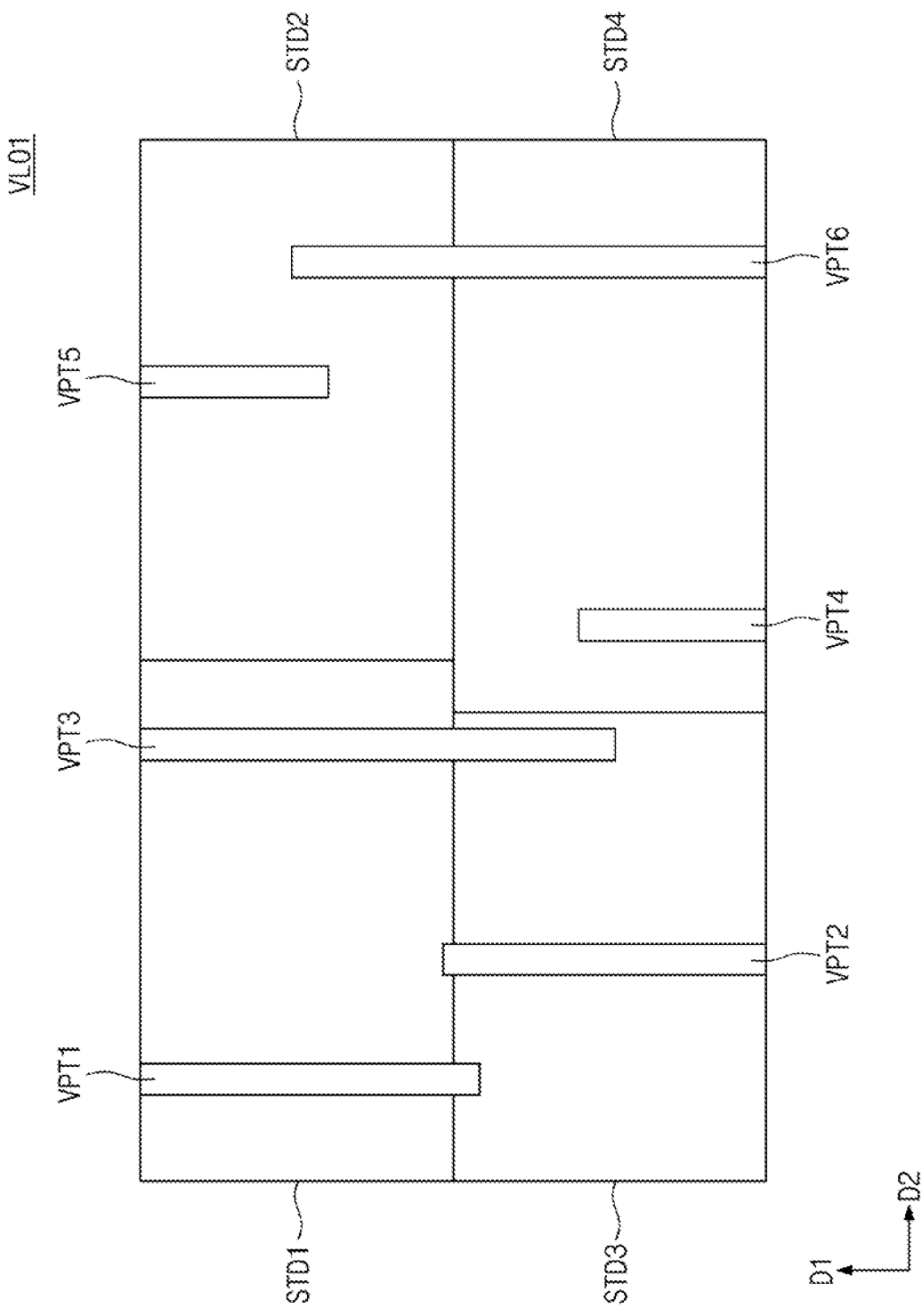
FIGS. 24 to 31 are plan views illustrating layouts in the designing method of FIG. 9, according to another example embodiment.

Referring to FIGS. 9 and 24, a first virtual layout VLO1 may be generated by placing standard cells STD1 to STD4 based on a virtual netlist (in S101). A routing operation may be performed on the first virtual layout VLO1 (in S101). As a result of the routing operation, first to sixth virtual patterns VPT1 to VPT6 may be generated on the first virtual layout VLO1. The first to sixth virtual patterns VPT1 to VPT6 may constitute one of metal layers, which will be formed in a BEOL operation. The first to sixth virtual patterns VPT1 to VPT6 of FIG. 24 may be line-and-space patterns.

Figure 25:
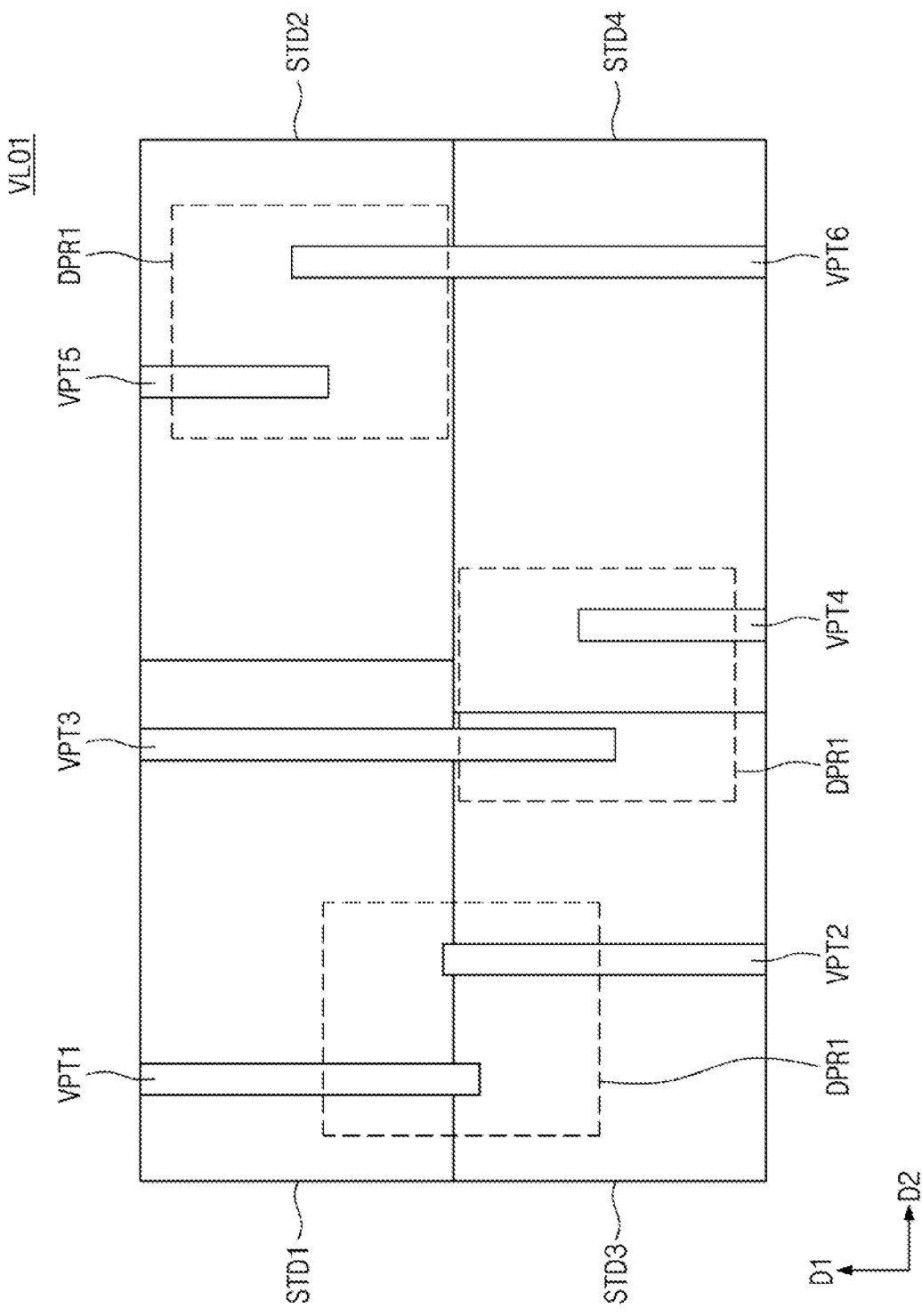

Referring to FIGS. 9 and 25, first duplicate pattern regions DPR1 may be searched in the first virtual layout VLO1 (in S102). The duplicate pattern region may include a single virtual pattern, as previously described in connection with FIG. 12, or may include a plurality of virtual patterns, as described in connection with FIG. 25.

In the present example embodiment, the duplicate pattern region may be chosen from a weak region near a line-end portion which easily causes an OPC error. The duplicate pattern region may be chosen to include a line-end portion of one virtual pattern and a neighboring virtual pattern that affects the line-end portion in an exposure process.

For example, as shown in FIG. 25, the first duplicate pattern region DPR1 may be defined to include both of a line-end of the first virtual pattern VPT1 and a line-end of the second virtual pattern VPT2 adjacent thereto. In addition, others of the first duplicate pattern regions DPR1, which are substantially the same as the first duplicate pattern region DPR1, may be searched.

As an example, a region including the line-ends of the third and fourth virtual patterns VPT3 and VPT4, which are adjacent to each other, and a region including the line-ends of the fifth and sixth virtual patterns VPT5 and VPT6, which are adjacent to each other, may be the same as a region including the line-ends of the first and second virtual patterns VPT1 and VPT2, which are adjacent to each other. In this case, the region including the line-ends of the first and second virtual patterns VPT1 and VPT2, which are adjacent to each other, along with the region including the line-ends of the third and fourth virtual patterns VPT3 and VPT4, which are adjacent to each other, and the region including the line-ends of the fifth and sixth virtual patterns VPT5 and VPT6, which are adjacent to each other, may be defined as the first duplicate pattern regions DPR1.

Figure 26:
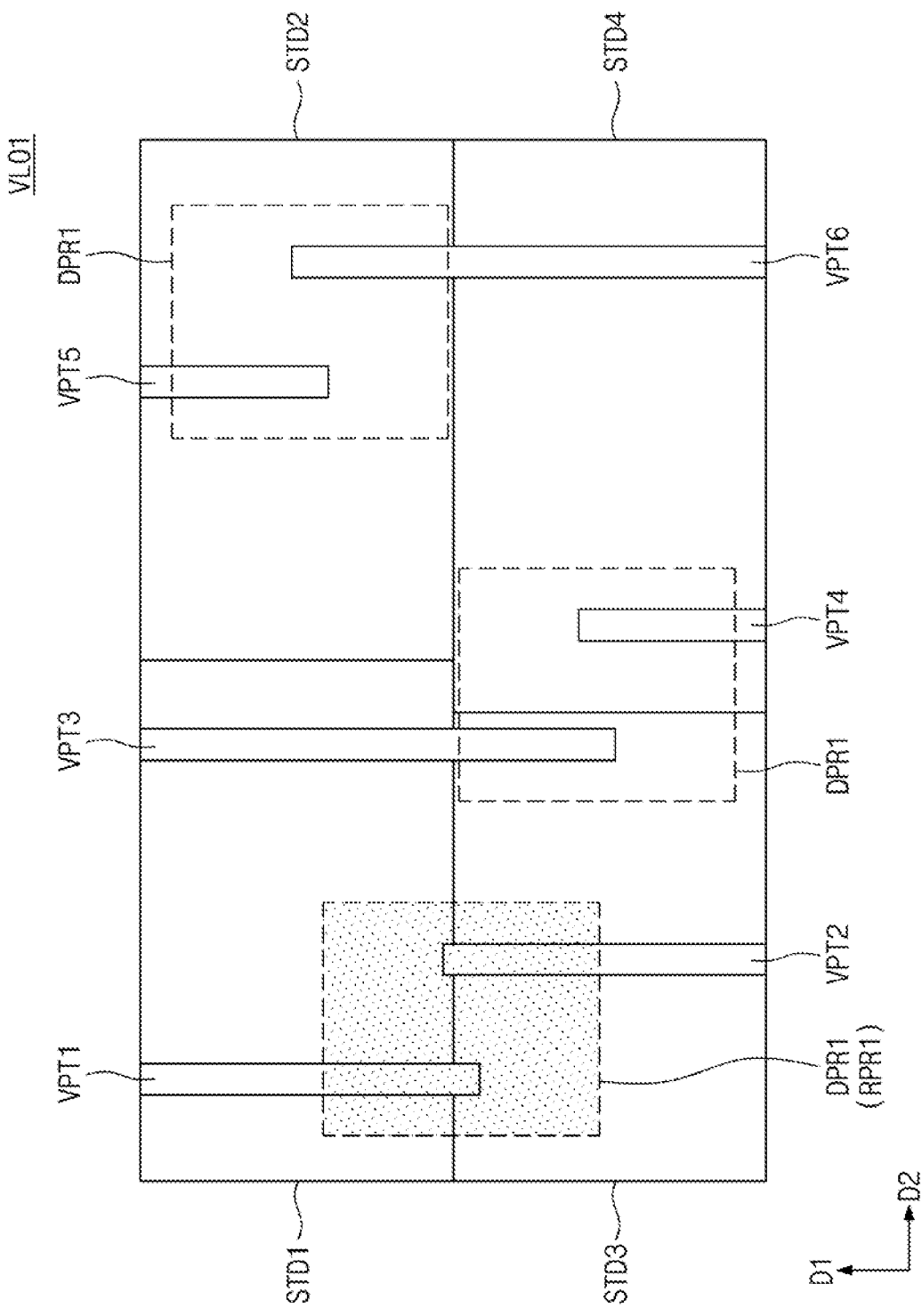

Referring to FIGS. 9 and 26, one of the first duplicate pattern regions DPR1 may be chosen as the first representative pattern region RPR1 (in S102). For example, one of the first duplicate pattern regions DPR1, which includes the line-ends of the first and second virtual patterns VPT1 and VPT2, may be chosen as the first representative pattern region RPR1. The first representative pattern region RPR1 may be marked to differentiate it from the others of the first duplicate pattern regions DPR1.

Figure 27:
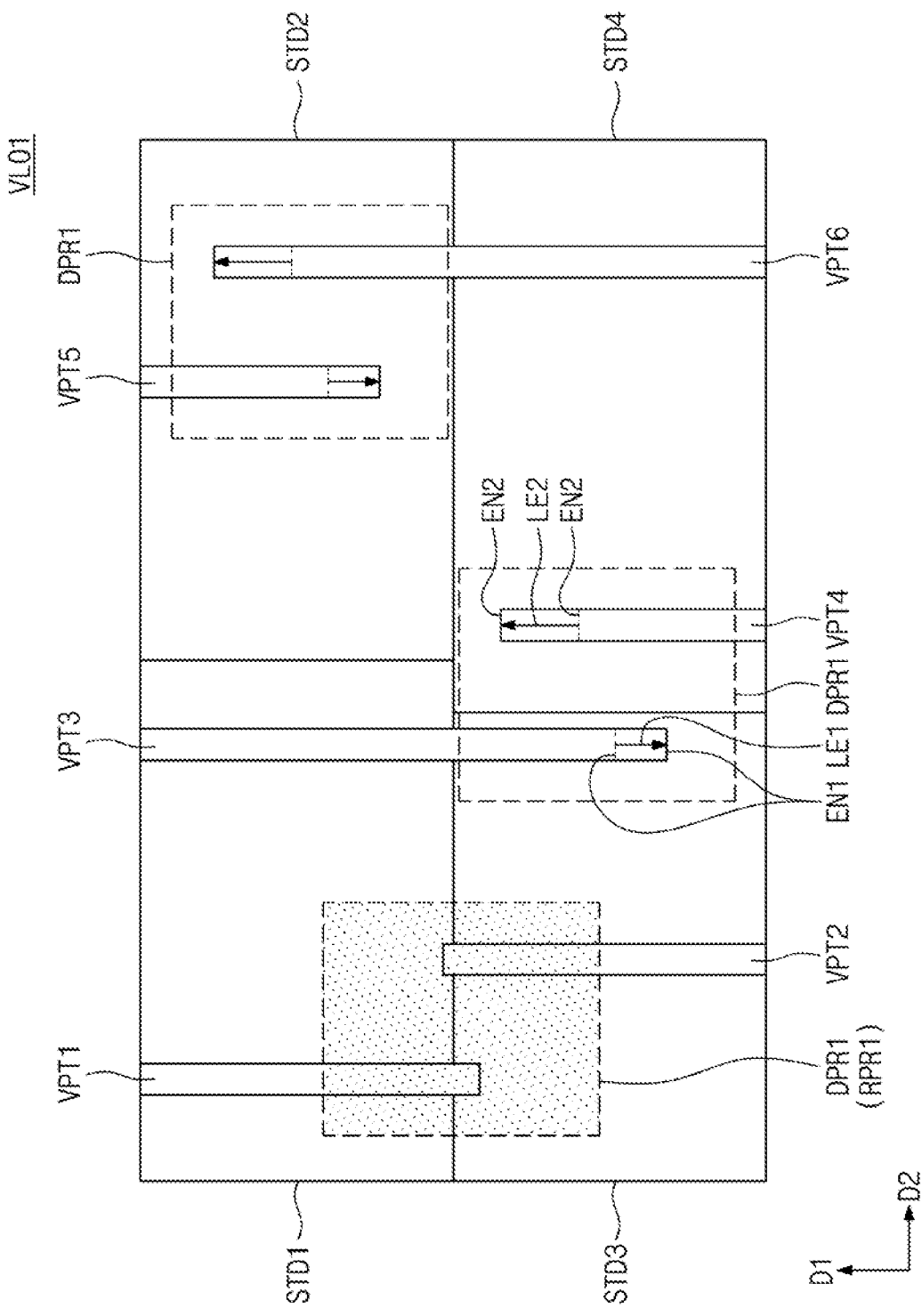

Referring to FIGS. 9 and 27, the shapes of the virtual patterns in the remaining ones of the first duplicate pattern regions DPR1, except the first representative pattern region RPR1, may be changed (in S103). For example, a line-end (i.e., a first end EN1) of the second virtual pattern VPT2 in the first duplicate pattern region DPR1 may be elongated or expanded by a first length LE1. A line-end (i.e., a second end EN2) of the fourth virtual pattern VPT4 may be elongated or expanded by a second length LE2. The first length LE1 may be equal to or different from the second length LE2. The line-ends of the fifth and sixth virtual patterns VPT5 and VPT6 in another of the first duplicate pattern regions DPR1 may be biased in a similar manner. Meanwhile, the line-ends of the first and second virtual patterns VPT1 and VPT2 in the marked first representative pattern region RPR1 may be maintained in their original shapes without any change.

Figure 28:
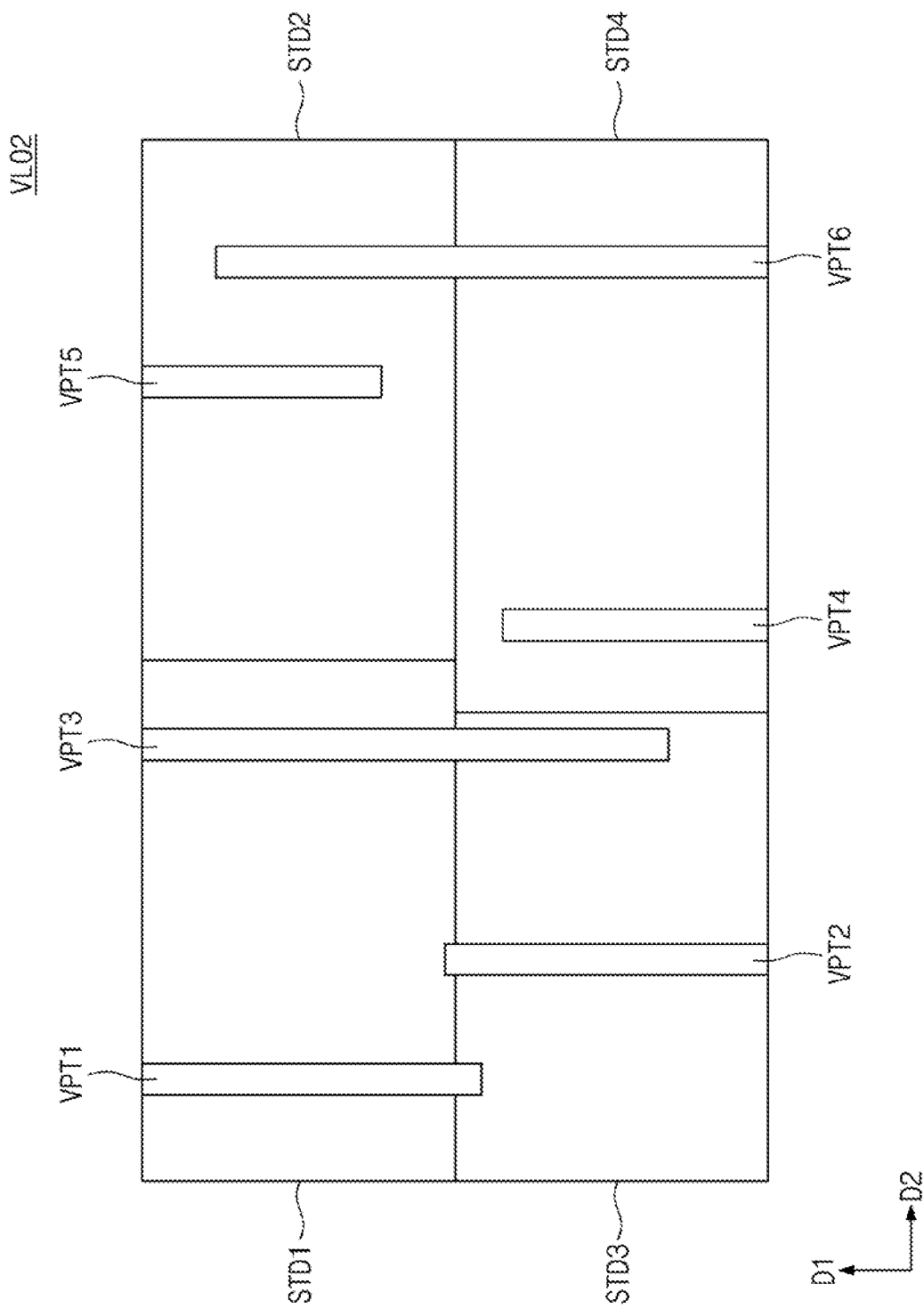

Referring to FIGS. 9 and 28, since the line-ends of the third to sixth virtual patterns VPT3 to VPT6 are changed or biased, the second virtual layout VLO2 different from the first virtual layout VLO1 may be generated (in S103). For example, the position relationship between the line-ends of the third and fourth virtual patterns VPT3 and VPT4 may be different from the position relationship between the line-ends of the first and second virtual patterns VPT1 and VPT2. The position relationship between the line-ends of the fifth and sixth virtual patterns VPT5 and VPT6 may be different from the position relationship between the line-ends of the first and second virtual patterns VPT1 and VPT2. Meanwhile, the position relationship between the line-ends of the third and fourth virtual patterns VPT3 and VPT4 may be the same as the position relationship between the line-ends of the fifth and sixth virtual patterns VPT5 and VPT6.

Figure 29:
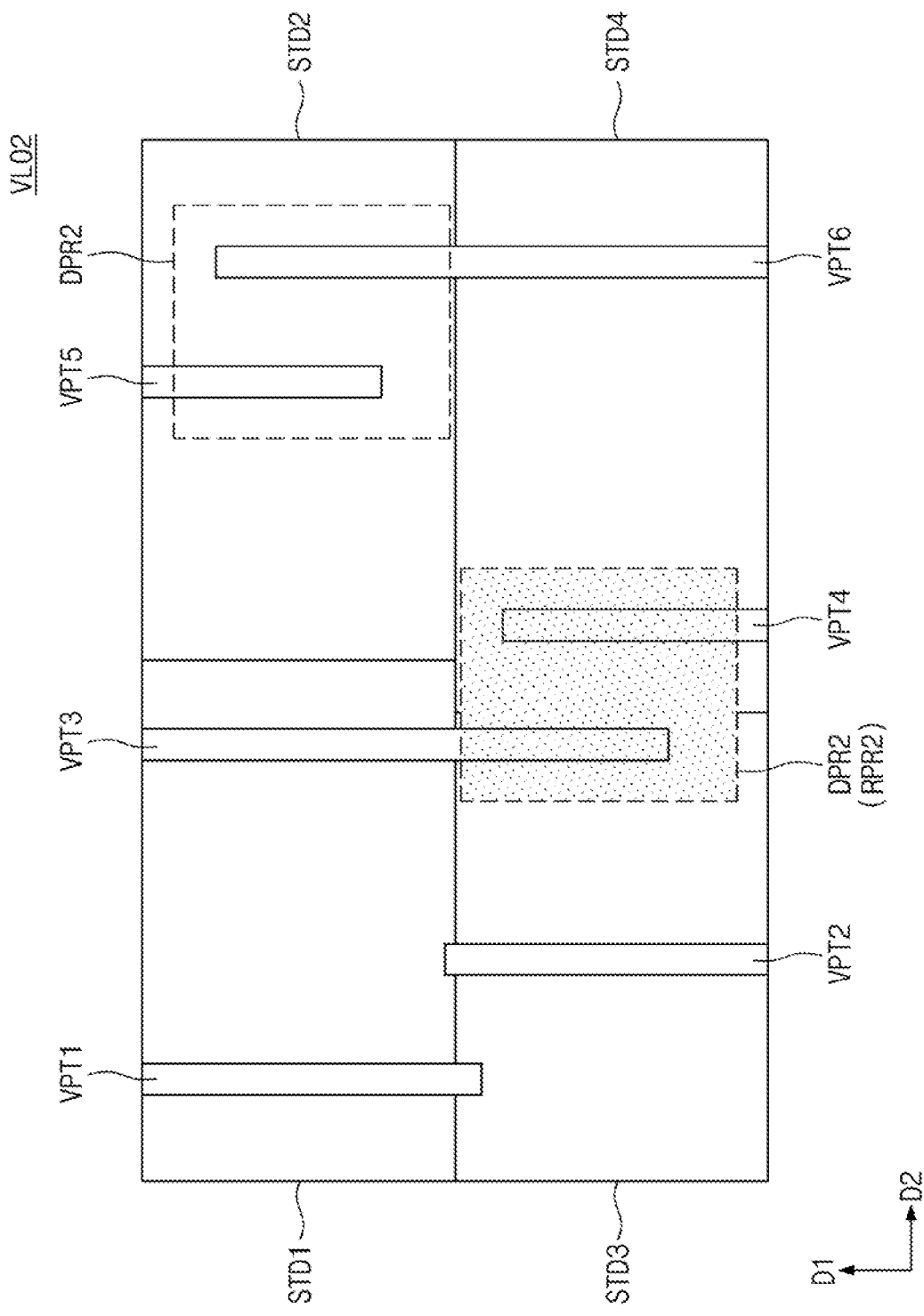

Referring to FIGS. 9 and 29, the second duplicate pattern regions DPR2 may be searched in the second virtual layout VLO2 (in S104). For example, the position relationship between the line-ends of the third and fourth virtual patterns VPT3 and VPT4 may be the same as the position relationship between the line-ends of the fifth and sixth virtual patterns VPT5 and VPT6. A region including the line-ends of the third and fourth virtual patterns VPT3 and VPT4, along with a region including the line-ends of the fifth and sixth virtual patterns VPT5 and VPT6, may be defined as the second duplicate pattern regions DPR2.

One of the second duplicate pattern regions DPR2 may be chosen as a second representative pattern region RPR2 (in S104). For example, the second duplicate pattern region DPR2 including the line-ends of the third and fourth virtual patterns VPT3 and VPT4 may be chosen as the second representative pattern region RPR2. The second representative pattern region RPR2 may be marked to differentiate it from the others of the second duplicate pattern regions DPR2.

Figure 30:
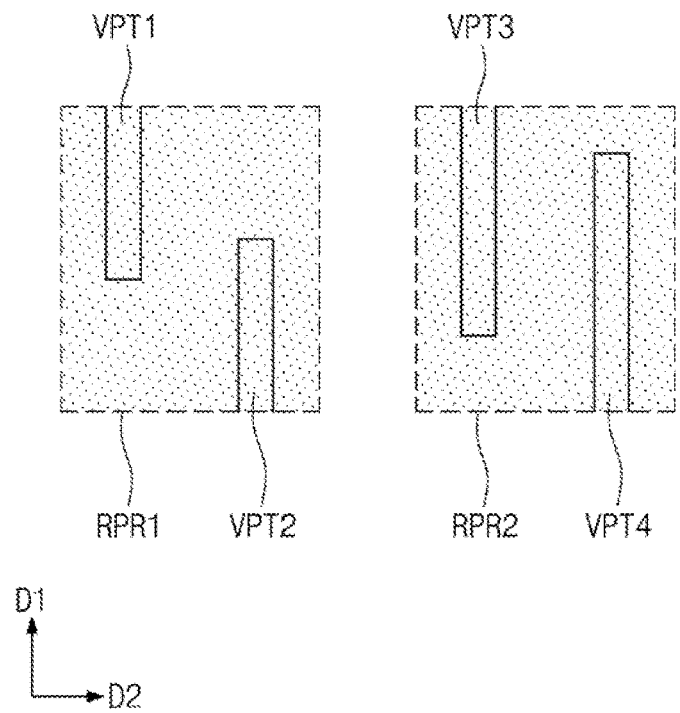

Referring to FIGS. 9 and 30, a first representative pattern region PRP1, which is chosen from the first virtual layout VLO1, and a second representative pattern region PRP2, which is chosen from the second virtual layout VLO2, may be collected (in S104). Thus, two or more representative pattern regions may be collected from a virtual layout, which is generated based on a single virtual netlist, by elongating or expanding a line-end of a pattern.

Figure 31:
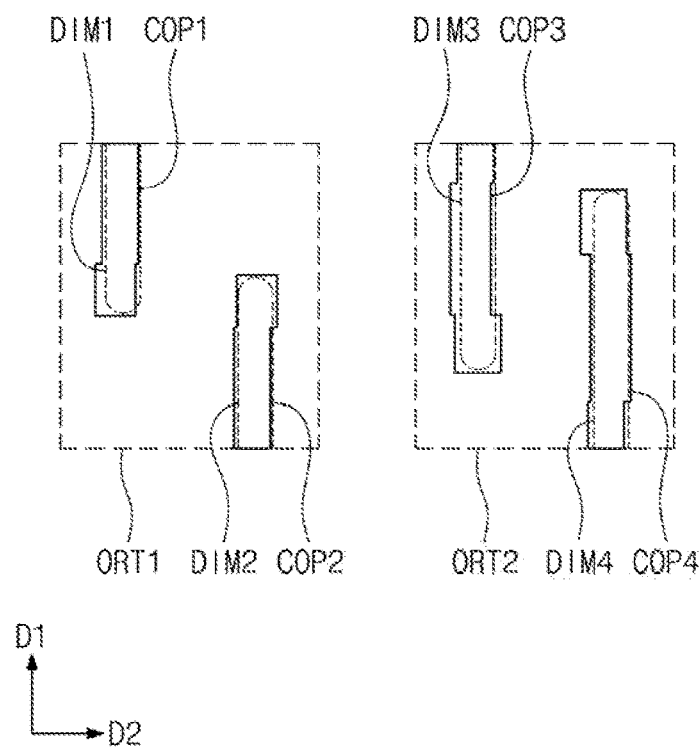

Referring to FIGS. 9 and 31, a first OPC result ORT1 and a second OPC result ORT2 may be obtained by performing an OPC operation on the collected representative pattern regions (e.g., the first and second representative pattern regions RPR1 and RPR2) respectively (in S106).

For example, first and second correction patterns COP1 and COP2 may be generated by performing the OPC operation on the first and second virtual patterns VPT1 and VPT2 of the first representative pattern region RPR1. The first and second correction patterns COP1 and COP2 may have first and second simulation images DIM1 and DIM2, respectively, which are generated through a simulation process using an OPC model.

Third and fourth correction patterns COP3 and COP4 may be generated by performing the OPC operation on the third and fourth virtual patterns VPT3 and VPT4 of the second representative pattern region RPR2. The third and fourth correction patterns COP3 and COP4 may have third and fourth simulation images DIM3 and DIM4, respectively, which are generated through the simulation process using the OPC model.

The first OPC result ORT1 for the first representative pattern region RPR1 of FIG. 31 and the second OPC result ORT2 for the second representative pattern region RPR2 may be stored in a database. The first OPC result ORT1 and the second OPC result ORT2, in conjunction with the OPC results ORT1 and ORT2 of FIG. 18 described above, may be used in a design process of an actual semiconductor device, which will be described below.

Figure 32:
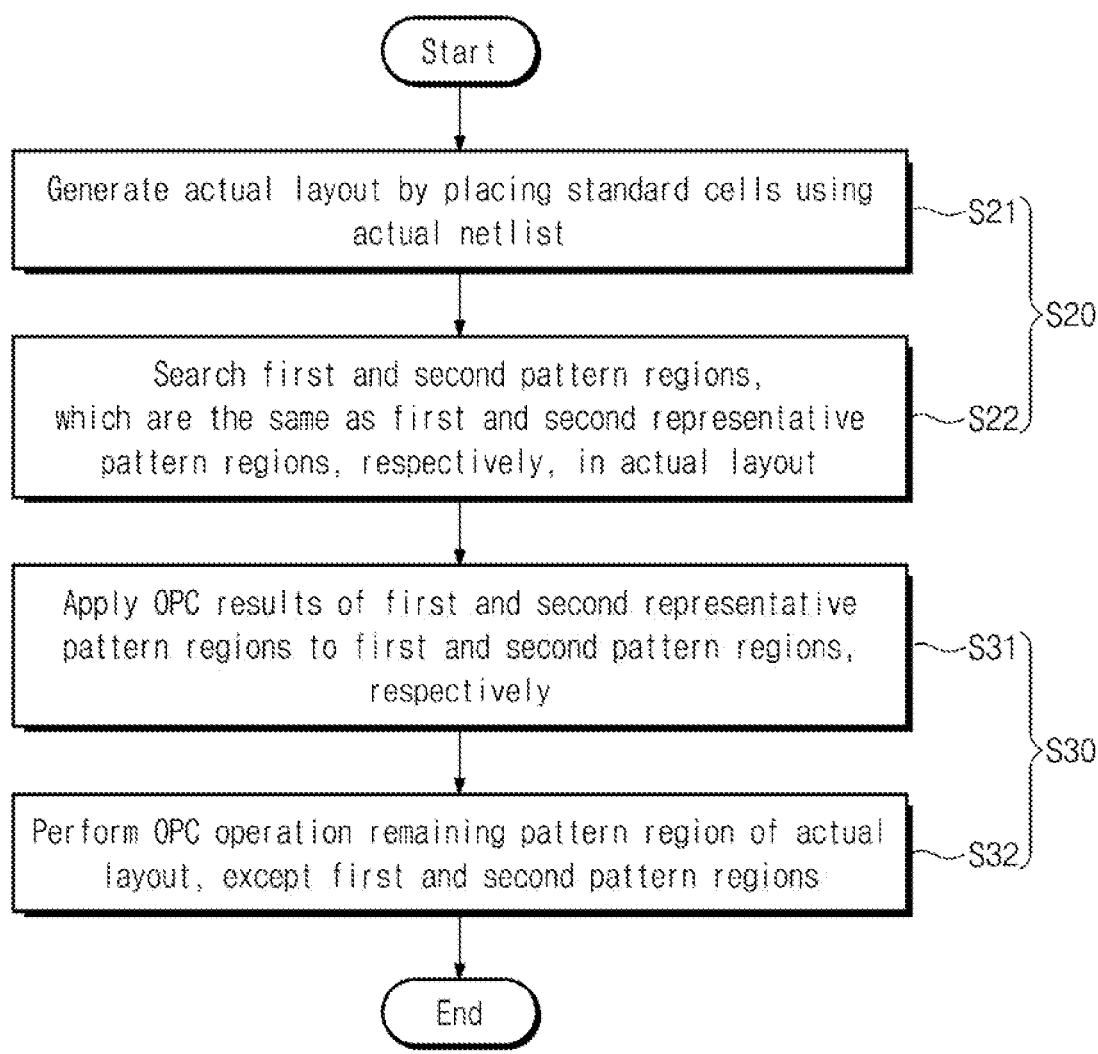
FIG. 32 is a flow chart illustrating a method of designing an actual semiconductor device according to an example embodiment.

FIG. 32 is a flow chart illustrating a method of designing an actual semiconductor device according to an example embodiment. FIGS. 33 to 37 are plan views illustrating layouts in the designing method of FIG. 32, according to an example embodiment.

Figure 33:
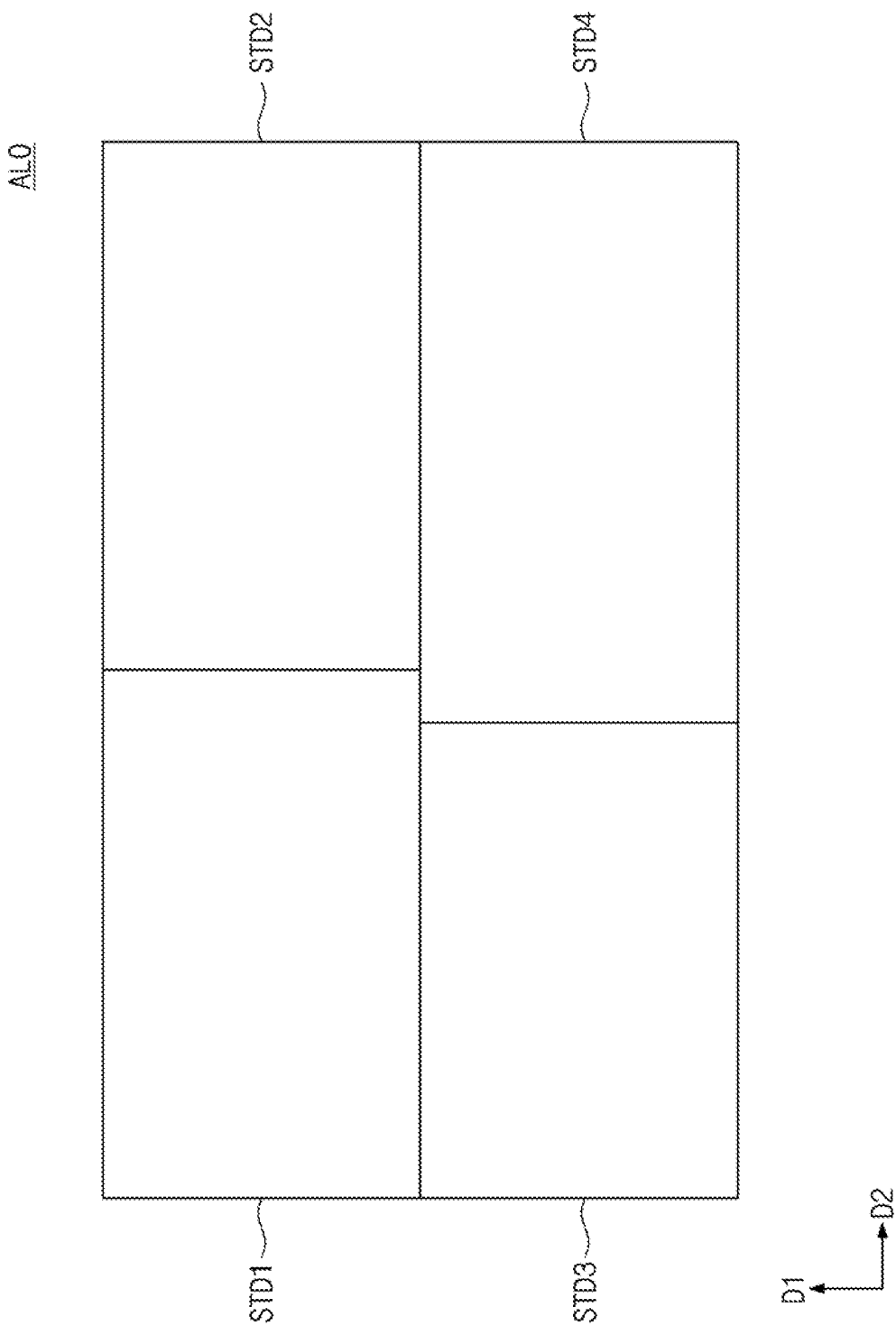
FIGS. 33 to 37 are plan views illustrating layouts in the designing method of FIG. 32, according to an example embodiment.

Referring to FIGS. 32 and 33, the layout design previously described with reference to FIG. 2 may be performed (in S20). First, an actual layout ALO may be generated by placing standard cells STD1 to STD4 based on an actual netlist (in S21). The actual netlist may be a netlist of a semiconductor device (e.g., a logic device or a system LSI chip), which will be mass-produced and sold as a product.

The standard cells, which are provided from a cell library, may be placed based on the actual netlist. For example, FIG. 33 illustrates an example in which first to fourth standard cells STD1 to STD4 are placed based on the actual netlist.

Figure 34:
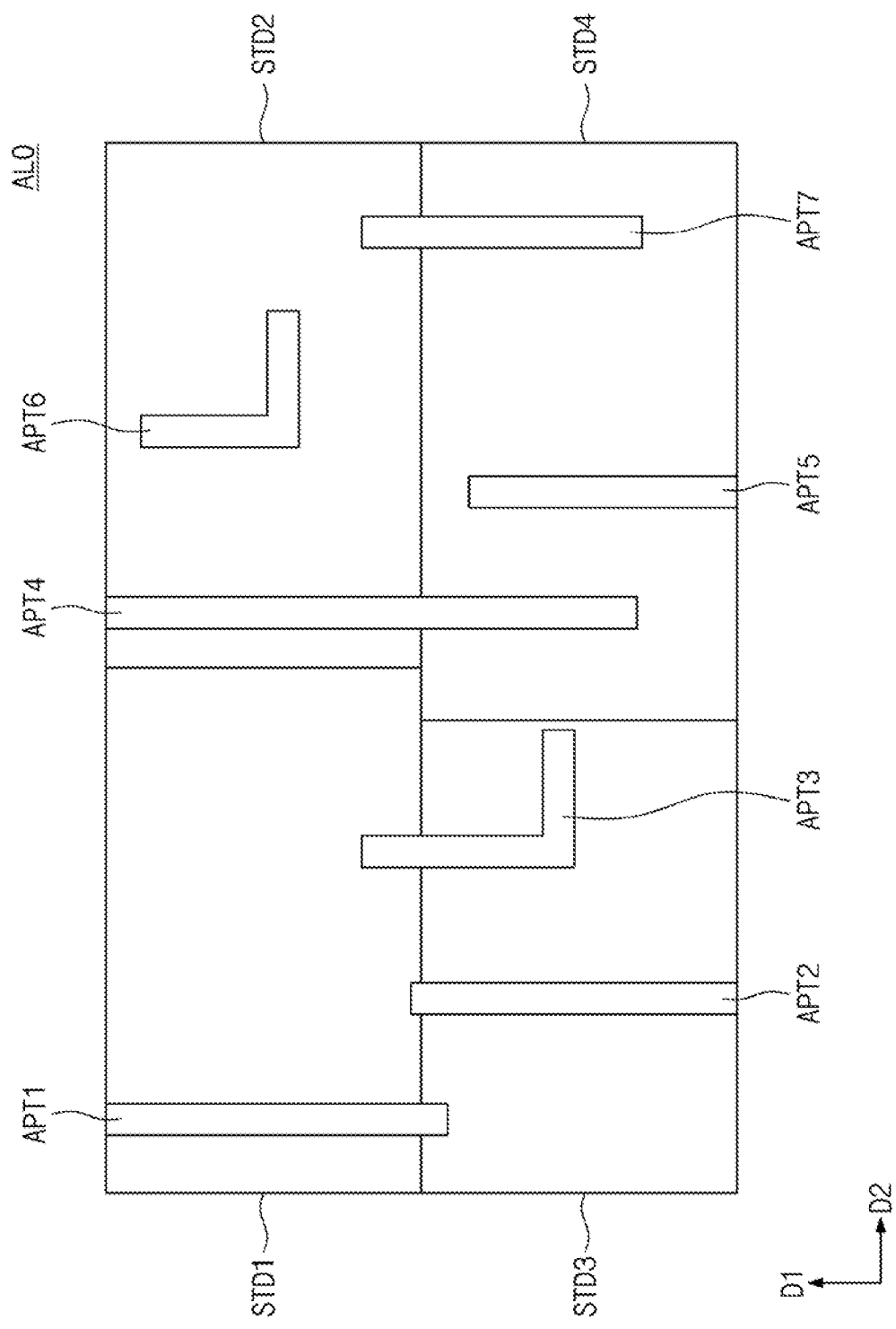

Referring to FIGS. 32 and 34, a routing operation may be performed on the actual layout ALO (in S21). As a result of the routing operation, interconnection line patterns may be provided on the actual layout ALO. The routing operation may be performed based on the actual netlist.

Referring to the example in FIG. 34, first to seventh actual patterns APT1 to APT7 may be provided on the actual layout ALO. The first to seventh actual patterns APT1 to APT7 may constitute one of metal or layers, which are formed through a back-end-of-line (BEOL) operation in a semiconductor manufacturing process. For example, the first to seventh actual patterns APT1 to APT7 may correspond to interconnection lines, which are provided in one of the first metal layer M1, the second metal layer M2, the third metal layer M3, and other metal layers thereon e.g., (M4, M5, M6, . . . ). For example, the first to seventh actual patterns APT1 to APT7 may corresponding interconnection line patterns in the second metal layer M2.

Figure 35:
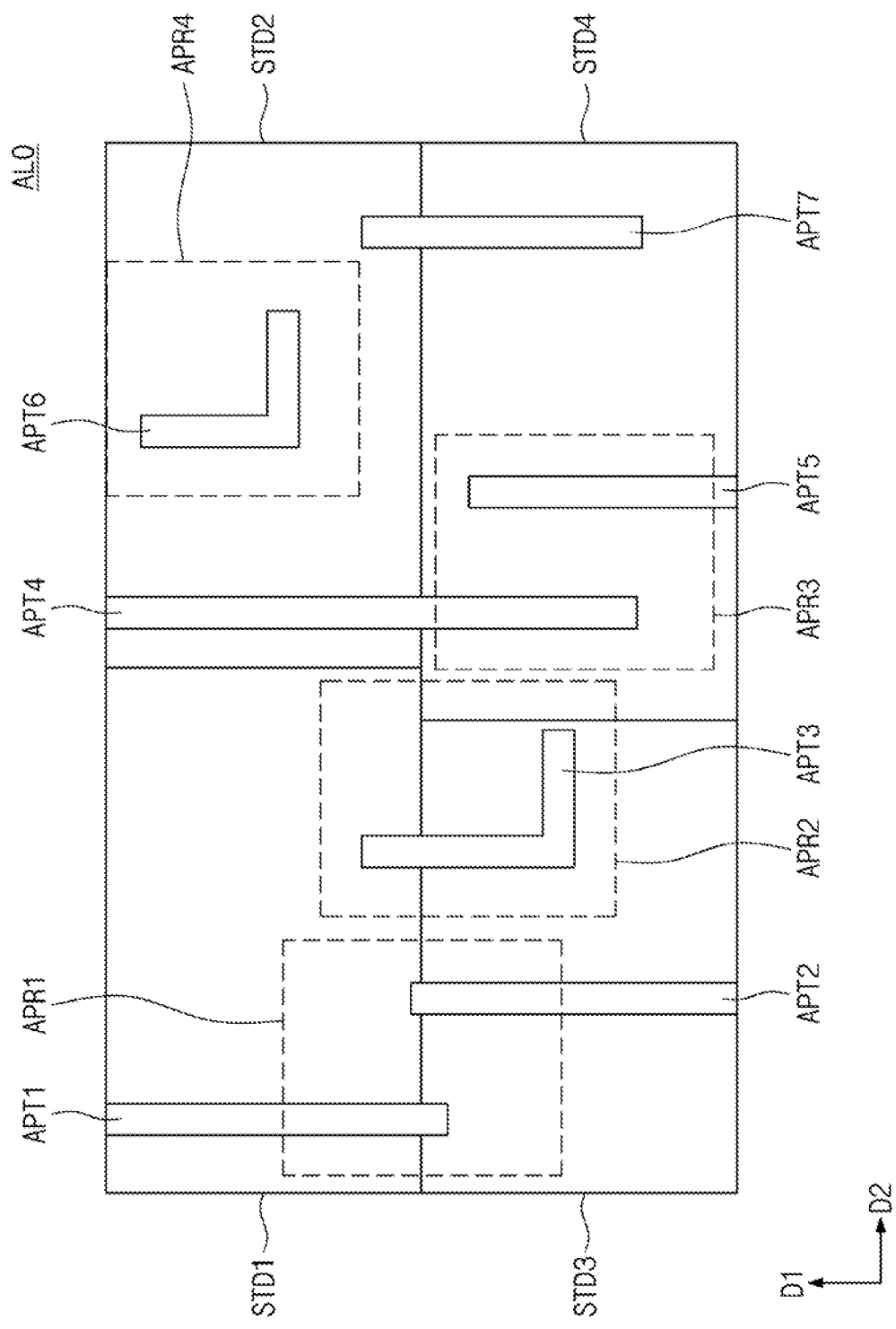

Referring to FIGS. 32 and 35, pattern regions, which are the same as the representative pattern regions (e.g., RPR1 and RPR2 of FIG. 17 and RPR1 and RPR2 of FIG. 30) obtained by the above method of FIG. 9, may be searched in the actual layout ALO (in S22).

For example, a pattern region, which includes a line-end of the first actual pattern APT1 and a line-end of the second actual pattern APT2 adjacent thereto, may be substantially the same as the first representative pattern region RPR1 of FIG. 30. A pattern region, which includes the third actual pattern APT3, may be substantially the same as the second representative pattern region RPR2 of FIG. 17. A pattern region, which includes a line-end of the fourth actual pattern APT4 and a line-end of the fifth actual pattern APT5 adjacent thereto, may be substantially the same as the second representative pattern region RPR2 of FIG. 30. A pattern region, which includes the sixth actual pattern APT6, may be substantially the same as the first representative pattern region RPR1 of FIG. 17. If the pattern regions, which are the same as the representative pattern regions, are found in the searching operation, the pattern regions may be defined as first to fourth pattern regions APR1 to APR4, respectively.

Figure 36:
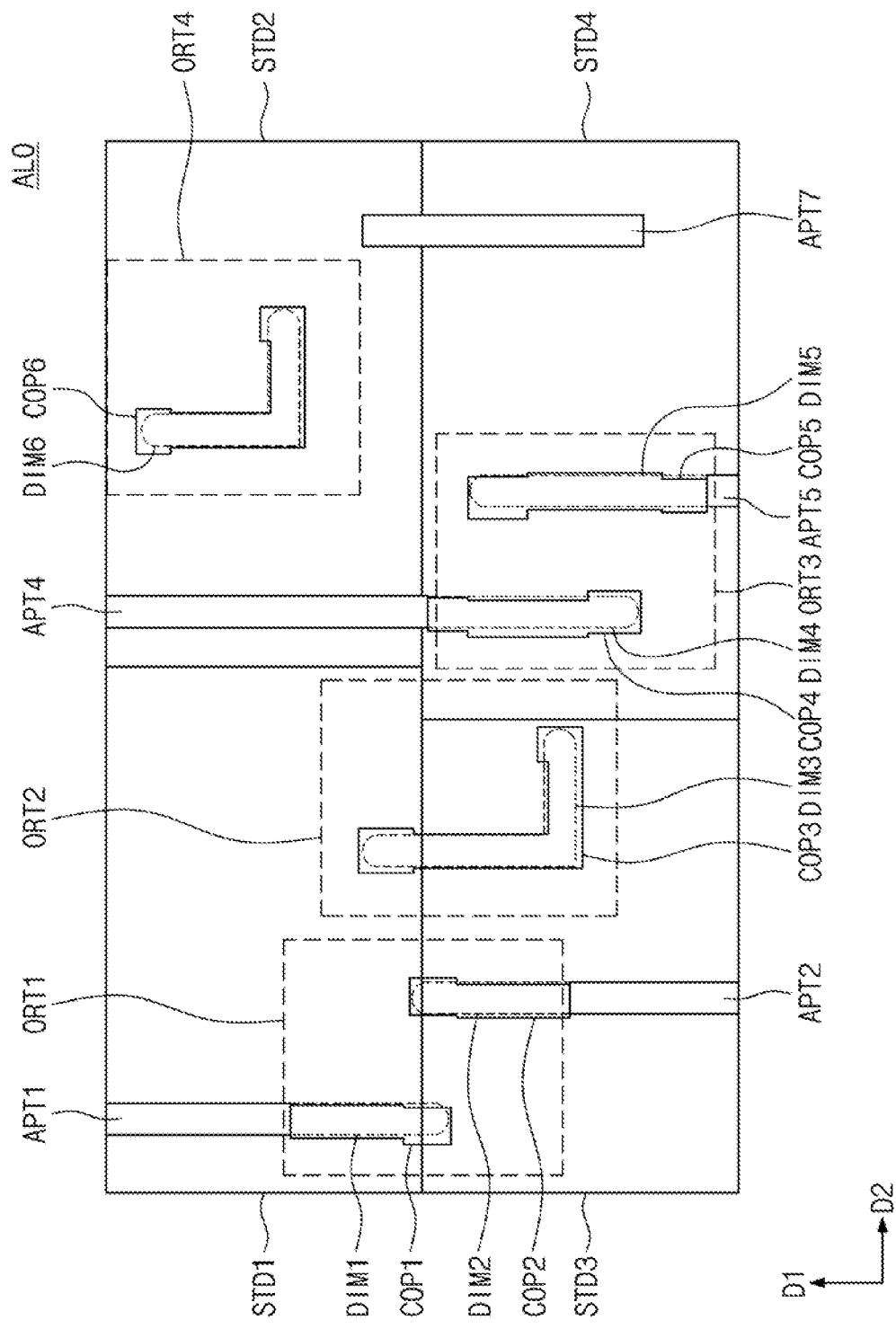

Referring to FIGS. 32 and 36, the OPC operation previously described with reference to FIG. 2 may be performed on the actual layout ALO (in S30). The OPC results obtained by the method of FIG. 9 may be directly applied to the first to fourth pattern regions APR1 to APR4 searched in the operation of FIG. 35 (in S31).

For example, the first OPC result ORT1 of FIG. 31 may be applied to the first pattern region APR1. The second OPC result ORT2 of FIG. 18 may be applied to the second pattern region APR2. The second OPC result ORT2 of FIG. 31 may be applied to the third pattern region APR3. The first OPC result ORT1 of FIG. 18 may be applied to the fourth pattern region APR4. Thus, first to fourth OPC results ORT1 to ORT4 may be applied to the first to fourth pattern regions APR1 to APR4, without an additional OPC operation.

A first OPC result ORT1 applied to the first pattern region APR1 may include first and second correction patterns COP1 and COP2. A second OPC result ORT2 applied to the second pattern region APR2 may include a third correction pattern COP3. A third OPC result ORT3 applied to the third pattern region APR3 may include fourth and fifth correction patterns COP4 and COP5. A fourth OPC result ORT4 applied to the fourth pattern region APR4 may include a sixth correction pattern COPE.

Figure 37:
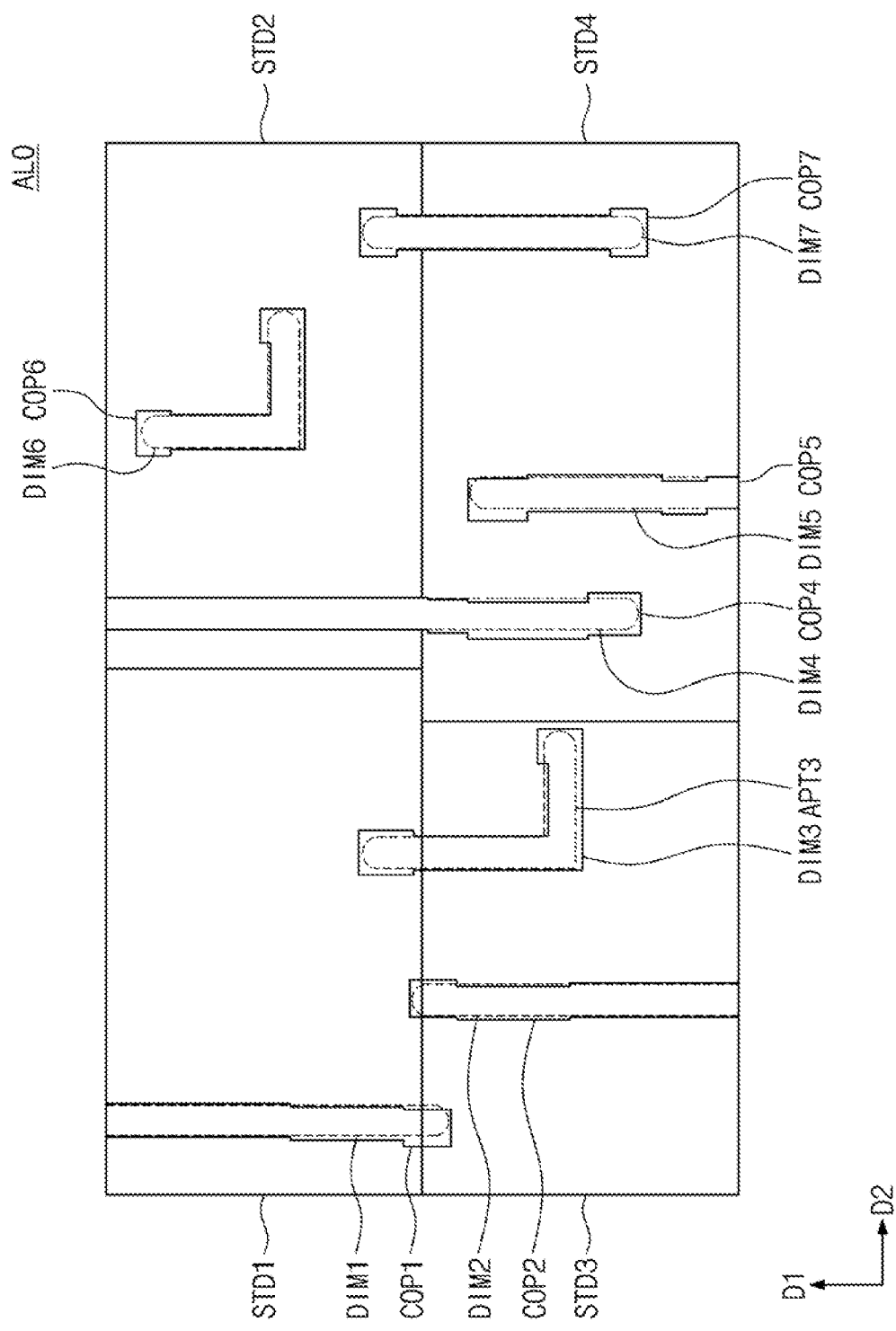

Referring to FIGS. 32 and 37, an OPC operation may be performed on a remaining pattern region of the actual layout ALO, except the first to fourth pattern regions APR1 to APR4 (i.e., the first to fourth OPC results ORT1 to ORT4) (in S32). Accordingly, first to seventh correction patterns COP1 to COPT may be respectively generated by selecting the first to seventh actual patterns APT1 to APT7 as target patterns in the OPC operation.

According to an example embodiment, a database of OPC results for a pattern region, which demands high accuracy and a lot of time in an actual OPC operation, may be constructed in advance by the above-described method of FIG. 9. Thus, it may be possible to immediately apply the previously-obtained OPC results to the actual layout ALO, without an additional OPC operation. The main operation (i.e., S30) of the OPC operation may be merely performed on a pattern region (e.g., a region including the seventh actual pattern APT7), which does not exist in the database, and a simple pattern region (e.g., a line extension region, in which any line-end is absent), which does not require high accuracy in the OPC operation, and thus, it may be possible to significantly reduce time required to finish the OPC operation.

Since a pattern region with line-ends is a weak region easily causing an OPC error, it may have a process defect often in an actual manufacturing process after the OPC operation. Such a process defect may lead to a reduction of yield in a process of manufacturing a semiconductor device. According to an example embodiment, the OPC results may be evaluated in advance, as described with reference to FIGS. 19 and 20, and thus, it may be possible to provide an accurate OPC result to a pattern region including line-ends (i.e., an OPC weak region). As a result, it may be possible to improve reliability of a semiconductor device and to increase a yield in a manufacturing process.

Figure 38:
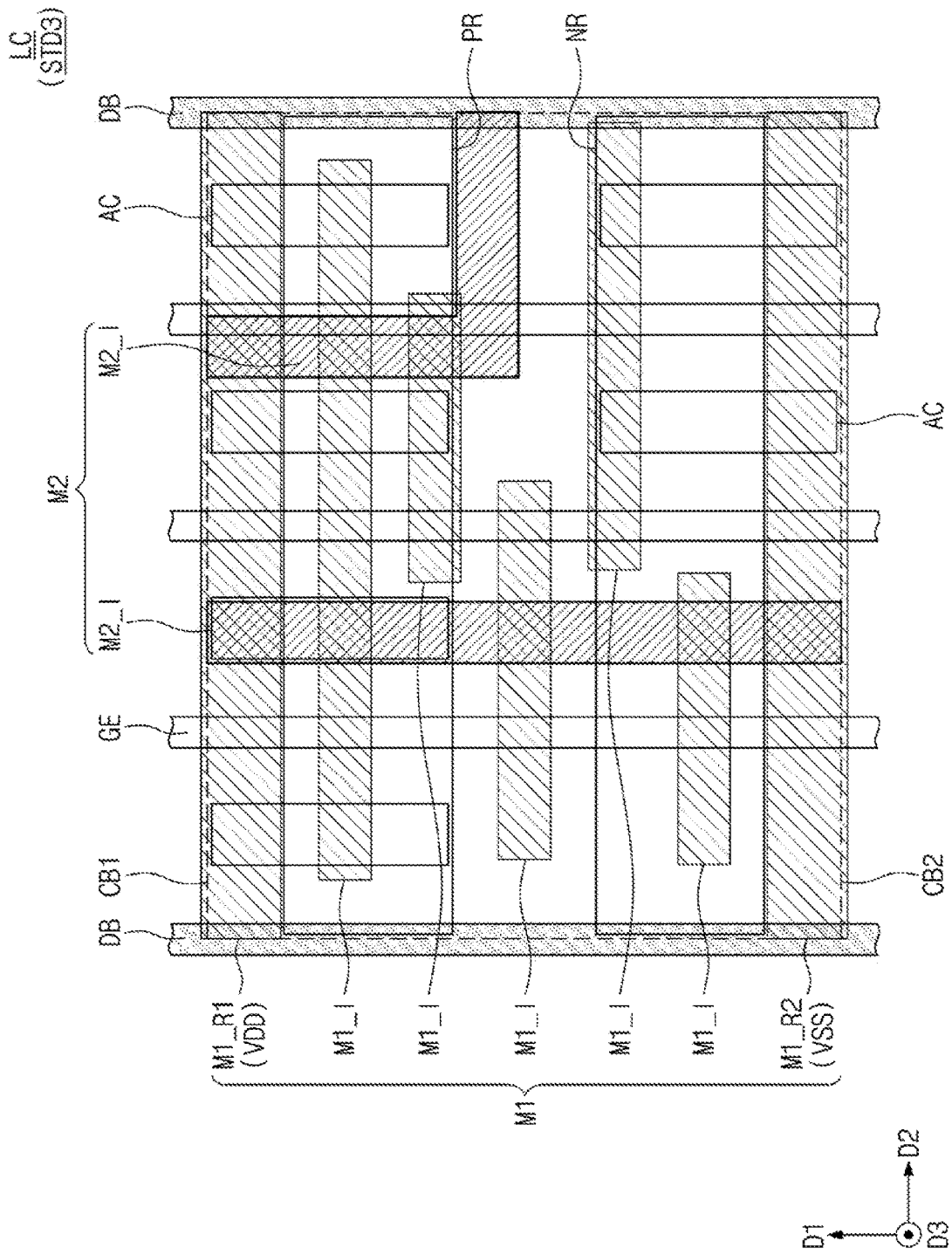
FIG. 38 is a plan view illustrating a semiconductor device according to an example embodiment.

FIG. 38 is a plan view illustrating a semiconductor device according to an example embodiment. FIGS. 39A to 39D are sectional views taken along lines A-A', B-B', C-C', and D-D', respectively, of FIG. 38. The semiconductor device shown in FIGS. 38 and 39A to 39D is an example of a semiconductor device that is realized on an actual substrate using the layout of the third standard cell STD3 of FIG. 37.

Referring to FIGS. 38 and 39A to 39D, a logic cell LC may be provided on the substrate 100. Logic transistors constituting a logic circuit may be disposed on the logic cell LC.

The substrate 100 may include a first active region PR and a second active region NR. The first active region PR may be a PMOSFET region, and the second active region NR may be an NMOSFET region. The substrate 100 may be a semiconductor substrate that is formed of or includes silicon, germanium, silicon-germanium, a compound semiconductor material, or the like. As an example, the substrate 100 may be a silicon wafer.

The first and second active regions PR and NR may be defined by a second trench TR2, which is formed in an upper portion of the substrate 100. The second trench TR2 may be located between the first and second active regions PR and NR. The first and second active regions PR and NR may be spaced apart from each other, in the first direction D1, with the second trench TR2 interposed therebetween. Each of the first and second active regions PR and NR may be extended in a second direction D2 that is different from the first direction D1.

First active patterns AP1 and second active patterns AP2 may be provided on the first active region PR and the second active region NR, respectively. The first and second active patterns AP1 and AP2 may be extended in the second direction D2 to be parallel to each other. The first and second active patterns AP1 and AP2 may be vertically protruding portions of the substrate 100 (see, e.g., FIG. 39C). A first trench TR1 may be defined between adjacent ones of the first active patterns AP1, and a first trench TR1 may also be defined between adjacent ones of the second active patterns AP2. The first trenches TR1 may be shallower than the second trench TR2.

A device isolation layer ST may fill, e.g., partially fill, the first and second trenches TR1 and TR2. The device isolation layer ST may be formed of or include silicon oxide. Upper portions of the first and second active patterns AP1 and AP2 may protrude vertically above the device isolation layer ST (e.g., see FIG. 39D). Each of the upper portions of the first and second active patterns AP1 and AP2 may be a fin-shaped pattern. The device isolation layer ST may not cover the upper portions of the first and second active patterns AP1 and AP2. In an implementation, the device isolation layer ST may not cover lower side surfaces of the first and second active patterns AP1 and AP2 (not shown).

First source/drain patterns SD1 may be provided on the upper portions of the first active patterns AP1. The first source/drain patterns SD1 may be impurity regions of a first conductivity type (e.g., p-type). A first channel pattern CH1 may be interposed between each pair of the first source/drain patterns SD1. Second source/drain patterns SD2 may be provided on the upper portions of the second active patterns AP2. The second source/drain patterns SD2 may be impurity regions of a second conductivity type (e.g., n-type). A second channel pattern CH2 may be interposed between each pair of the second source/drain patterns SD2.

The first and second source/drain patterns SD1 and SD2 may be epitaxial patterns, which are formed by a selective epitaxial growth process. The first and second source/drain patterns SD1 and SD2 may have top surfaces that are coplanar with top surfaces of the first and second channel patterns CH1 and CH2. In an implementation, the top surfaces of the first and second source/drain patterns SD1 and SD2 may be higher than the top surfaces of the first and second channel patterns CH1 and CH2 (not shown).

The first source/drain patterns SD1 may include a semiconductor material (e.g., SiGe) having a lattice constant greater than that of the substrate 100, and thus the first source/drain patterns SD1 may exert a compressive stress on the first channel patterns CH1. The second source/drain patterns SD2 may be formed of or include the same semiconductor material (e.g., Si) as the substrate 100.

Gate electrodes GE may be provided to cross the first and second active patterns AP1 and AP2 and to extend in the first direction D1. The gate electrodes GE may be arranged with a constant pitch in the second direction D2. The gate electrodes GE may be vertically overlapped with the first and second channel patterns CH1 and CH2. Each of the gate electrodes GE may be provided to face a top surface and opposite side surfaces of each of the first and second channel patterns CH1 and CH2.

Figure 39A:
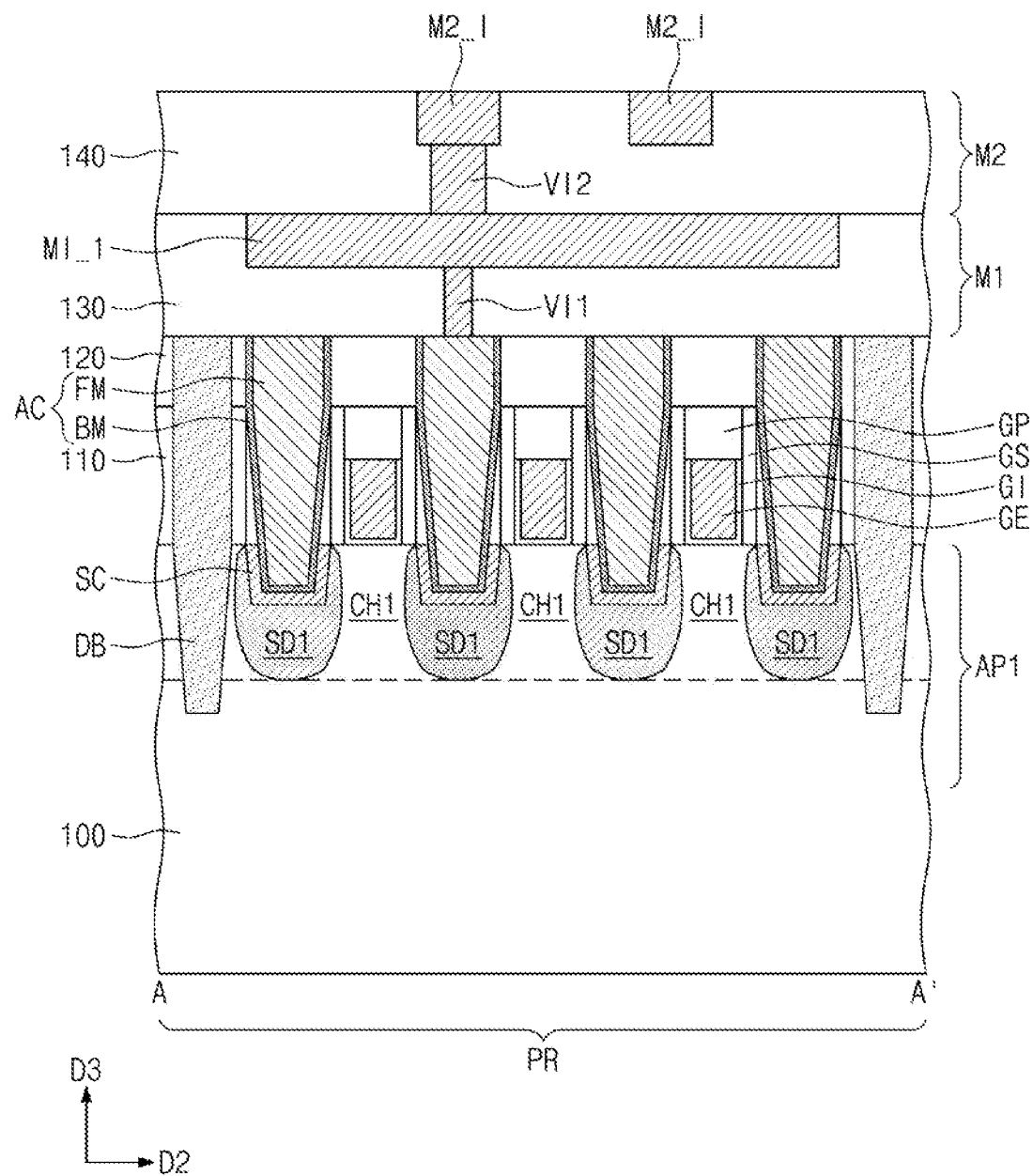
FIGS. 39A to 39D are sectional views taken along lines A-A', B-B', C-C', and D-D', respectively, of FIG. 38.
Figure 39B:
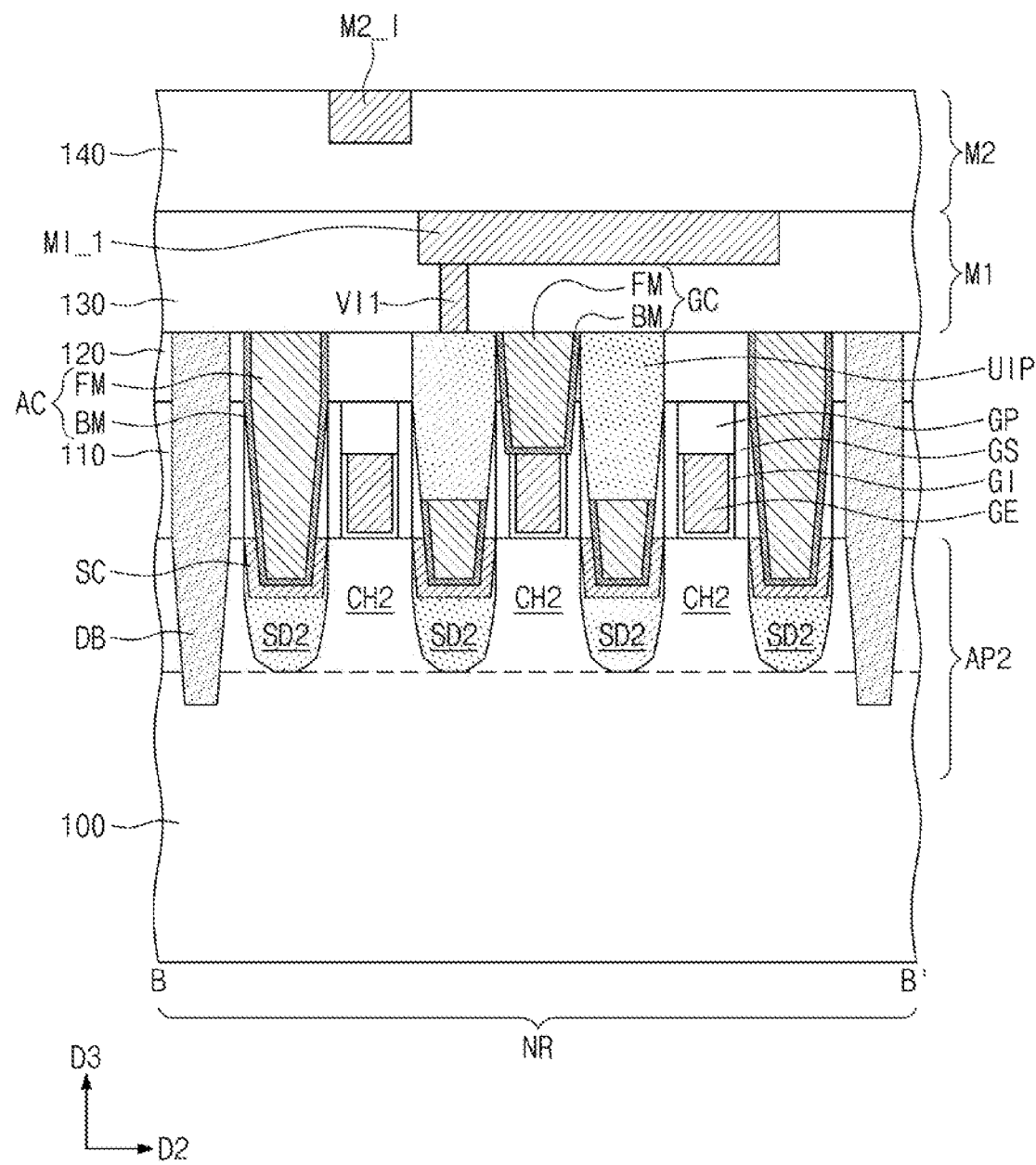
Figure 39C:
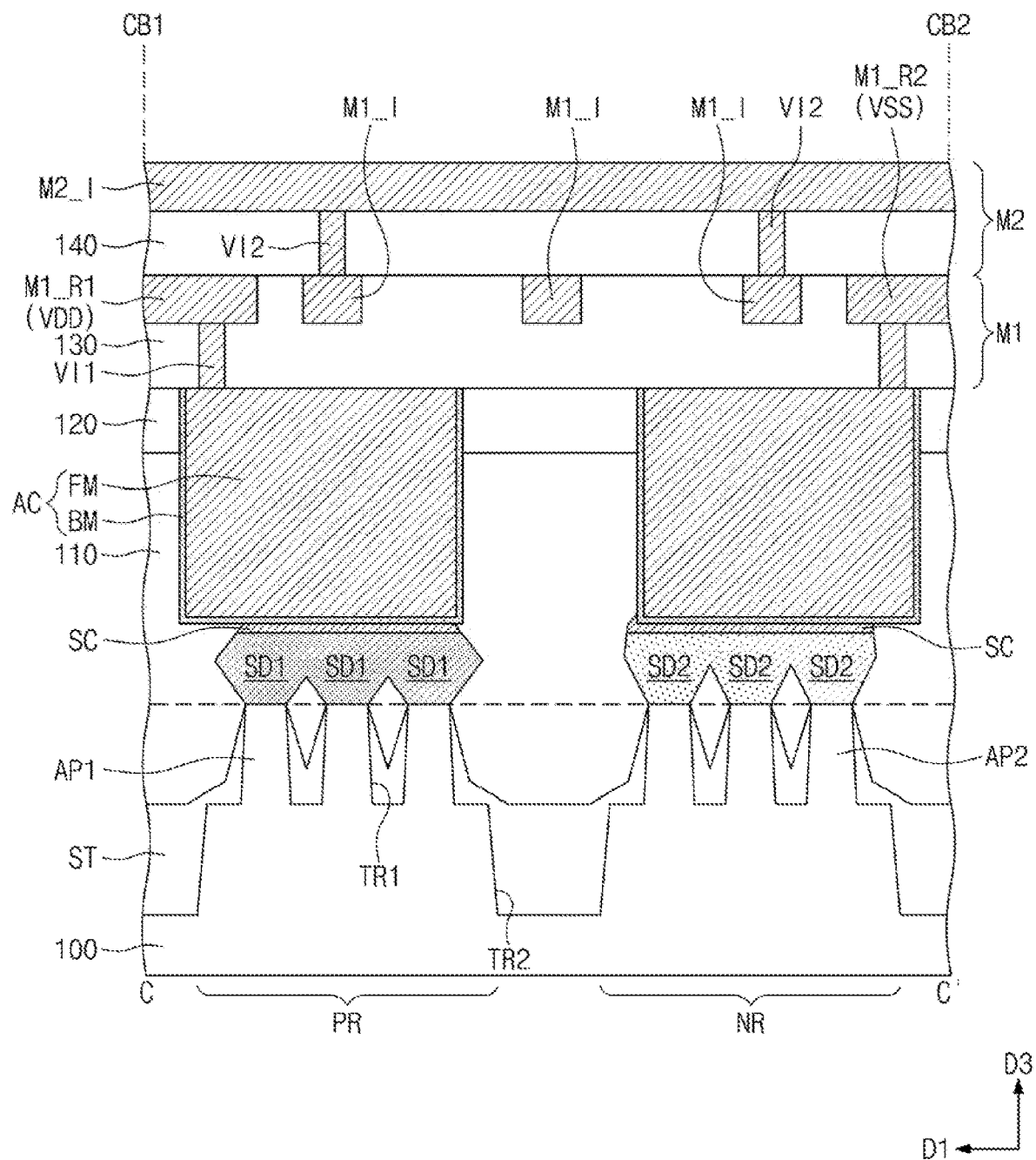
Figure 39D:
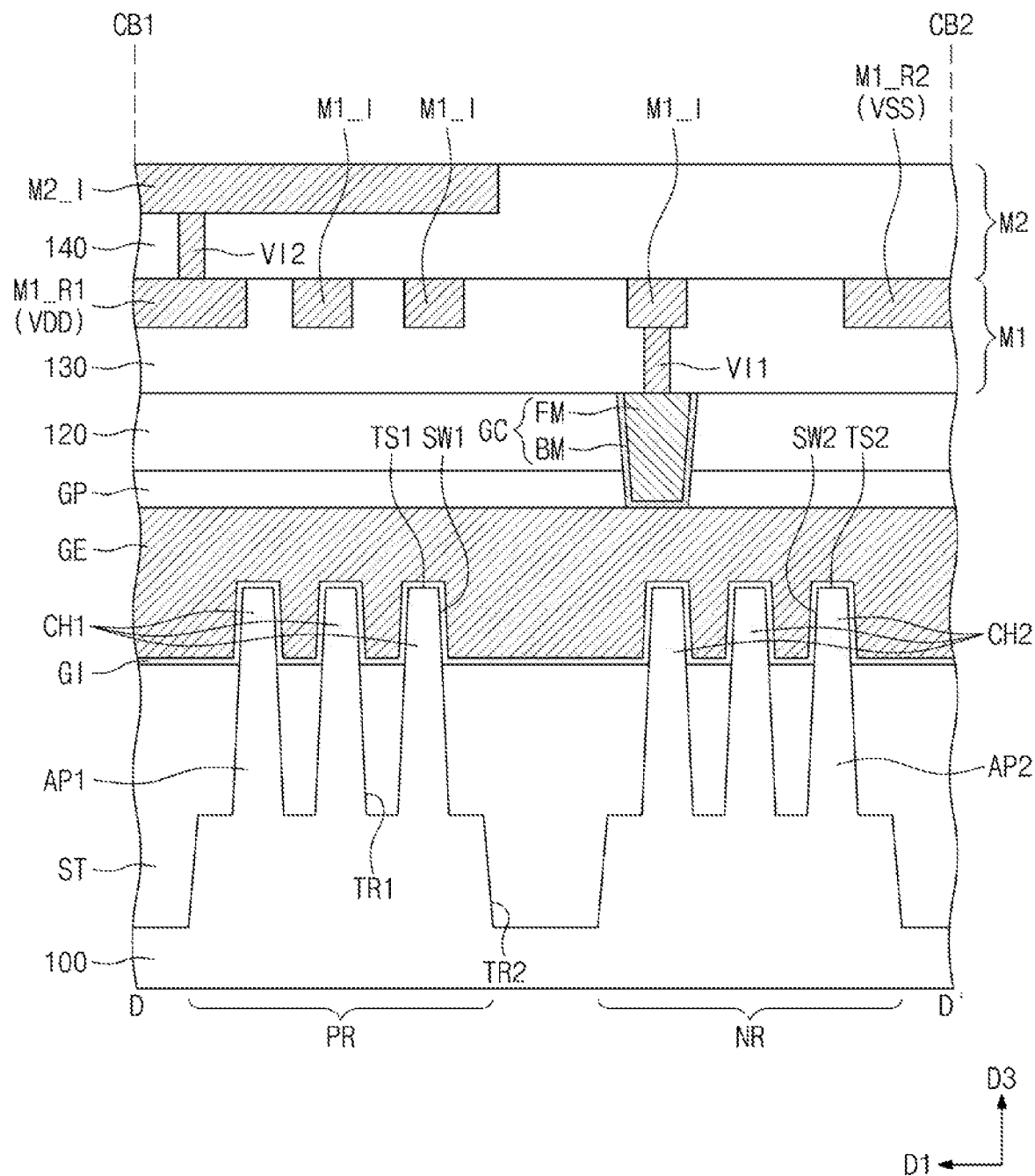

For example, referring to FIG. 39D, the gate electrode GE may be provided on a first top surface TS1 of the first channel pattern CH1 and on at least one first side surface SW1 of the first channel pattern CH1. The gate electrode GE may be provided on a second top surface TS2 of the second channel pattern CH2 and on at least one second side surface SW2 of the second channel pattern CH2. Thus, transistors may be three-dimensional field-effect transistors (e.g., FinFETs), in which the gate electrodes GE are provided to three-dimensionally surround the channel patterns CH1 and CH2.

Referring to FIGS. 38 and 39A to 39D, gate spacers GS may be disposed on opposite side surfaces of each of the gate electrodes GE. The gate spacers GS may be extended along the gate electrodes GE, e.g., in the first direction D1. Top surfaces of the gate spacers GS may be higher than the top surfaces of the gate electrodes GE. The top surfaces of the gate spacers GS may be coplanar with a top surface of a first interlayer insulating layer 110, which will be described below. The gate spacers GS may be formed of or include one or more of SiCN, SiCON, or SiN. The gate spacers GS may have a multi-layered structure including at least two of SiCN, SiCON, or SiN.

A gate capping pattern GP may be provided on each of the gate electrodes GE. The gate capping pattern GP may be extended along the gate electrode GE or in the first direction D1. The gate capping pattern GP may be formed of or include a material having an etch selectivity with respect to first and second interlayer insulating layers 110 and 120, which will be described below. For example, the gate capping patterns GP may be formed of or include one or more of SiON, SiCN, SiCON, or SiN.

A gate dielectric pattern GI may be interposed between the gate electrode GE and the first active pattern AP1 and between and the gate electrode GE and the second active pattern AP2. The gate dielectric pattern GI may be extended along a bottom surface of the gate electrode GE disposed thereon. As an example, the gate dielectric pattern GI may cover the first top surface TS1 and the first side surface SW1 of the first channel pattern CH1. The gate dielectric pattern GI may cover the second top surface TS2 and the second side surfaces SW2 of the second channel pattern CH2. The gate dielectric pattern GI may cover a top surface of the device isolation layer ST below the gate electrode GE (e.g., see FIG. 39D).

The gate dielectric pattern GI may be formed of or include a high-k dielectric material, whose dielectric constant is higher than that of a silicon oxide layer. For example, the high-k dielectric material may include one or more of hafnium oxide, hafnium silicon oxide, hafnium zirconium oxide, hafnium tantalum oxide, lanthanum oxide, zirconium oxide, zirconium silicon oxide, tantalum oxide, titanium oxide, barium strontium titanium oxide, barium titanium oxide, strontium titanium oxide, lithium oxide, aluminum oxide, lead scandium tantalum oxide, or lead zinc niobate.

The gate electrode GE may include a first metal pattern and a second metal pattern on the first metal pattern. The first metal pattern may be provided on the gate dielectric pattern GI to be adjacent to the first and second channel patterns CH1 and CH2. The first metal pattern may include a work function metal which adjusts a threshold voltage of the transistor. By adjusting a thickness and composition of the first metal pattern, it may be possible to realize a transistor having a desired threshold voltage. The first metal pattern may include a metal nitride layer. For example, the first metal pattern may include at least one metallic material, which is selected from the group consisting of titanium (Ti), tantalum (Ta), aluminum (Al), tungsten (W), and molybdenum (Mo), and nitrogen (N). The first metal pattern may further include carbon (C). The first metal pattern may include a plurality of work function metal layers, which are stacked. The second metal pattern may include a metallic material whose resistance is lower than the first metal pattern. For example, the second metal pattern may include at least one metal selected from the group consisting of tungsten (W), aluminum (Al), titanium (Ti), and tantalum (Ta).

The first interlayer insulating layer 110 may be provided on the substrate 100. The first interlayer insulating layer 110 may cover the gate spacers GS and the first and second source/drain patterns SD1 and SD2. A top surface of the first interlayer insulating layer 110 may be substantially coplanar with the top surfaces of the gate capping patterns GP and the top surfaces of the gate spacers GS. A second interlayer insulating layer 120 may be provided on the first interlayer insulating layer 110 to cover the top surfaces of the gate capping patterns GP and the top surfaces of the gate spacers GS. A third interlayer insulating layer 130 may be provided on the second interlayer insulating layer 120. A fourth interlayer insulating layer 140 may be provided on the third interlayer insulating layer 130. One or more of the first to fourth interlayer insulating layers 110 to 140 may be formed of or include silicon oxide.

A pair of division structures DB, which are opposite to each other in the second direction D2, may be provided at both sides of the logic cell LC. The division structures DB may be extended in the first direction D1 and parallel to the gate electrodes GE. A pitch between the division structure DB and the gate electrode GE adjacent thereto may be equal to a pitch between the gate electrodes GE (see FIG. 38).

The division structure DB may penetrate the first and second interlayer insulating layers 110 and 120, and may be extended into the first and second active patterns AP1 and AP2 so as to penetrate an upper portion of each of the first and second active patterns AP1 and AP2. The division structure DB may separate the first and second active regions PR and NR of the logic cell LC from the active region of a neighboring logic cell.

Active contacts AC may be provided to penetrate the first and second interlayer insulating layers 110 and 120 and to be electrically connected to the first and second source/drain patterns SD1 and SD2, respectively. An active contact AC may be provided between each pair of the gate electrodes GE.

The active contact AC may be a self-aligned contact. For example, the active contact AC may be formed by a self-alignment process using the gate capping pattern GP and the gate spacer GS. The active contact AC may cover at least a portion of the side surface of the gate spacer GS. In an implementation, the active contact AC may be provided to cover a portion of the top surface of the gate capping pattern GP (not shown).

Each of the active and gate contacts AC and GC may include a conductive pattern FM and a barrier pattern BM enclosing the conductive pattern FM. The conductive pattern FM may be formed of or include at least one metallic material of, for example, aluminum, copper, tungsten, molybdenum, or cobalt. The barrier pattern BM may cover side and bottom surfaces of the conductive pattern FM. The barrier pattern BM may include a metal layer and a metal nitride layer. The metal layer may be formed of or include one or more of titanium, tantalum, tungsten, nickel, cobalt, or platinum. The metal nitride layer may be formed of or include one or more of titanium nitride (TiN), tantalum nitride (TaN), tungsten nitride (WN), nickel nitride (NiN), cobalt nitride (CoN), or platinum nitride (PtN).

A silicide pattern SC may be interposed between the active contact AC and the first source/drain pattern SD1 and between the active contact AC and the second source/drain pattern SD2. The active contact AC may be electrically connected to the source/drain pattern SD1 or SD2 through the silicide pattern SC. The silicide pattern SC may be formed of or include one or more of metal silicide materials (e.g., titanium silicide, tantalum silicide, tungsten silicide, nickel silicide, or cobalt silicide).

Gate contacts GC may be provided to penetrate the second interlayer insulating layer 120 and the gate capping pattern GP and to be electrically connected to the gate electrodes GE, respectively.

Referring to FIG. 39B, a region on the active contacts AC that are near the gate contact GC may be filled with an upper insulating pattern UIP. Accordingly, it may be possible to prevent the gate contact GC from being in contact with the active contact AC adjacent thereto and thereby prevent a short circuit issue from occurring.

A first metal layer M1 may be provided in the third interlayer insulating layer 130. The first metal layer M1 may include a first power line M1_R1, a second power line M1_R2, and first interconnection lines M1_I.

Each of the first and second power lines M1_R1 and M1_R2 may be extended in the second direction D2 to cross the logic cell LC. For example, a first cell border CB1 extending in the second direction D2 may be defined in the logic cell LC. A second cell border CB2 may be defined in a region of the logic cell LC opposite to the first cell border CB1. The first power line M1_R1 may be disposed on the first cell border CB1. The first power line M1_R1 may be extended along the first cell border CB1 and in the second direction D2. The second power line M1_R2 may be disposed on the second cell border CB2. The second power line M1_R2 may be extended along the second cell border CB2 and in the second direction D2.

The first interconnection lines M1_I may be disposed between the first and second power lines M1_R1 and M1_R2. Each of the first interconnection lines M1_I may be a line- or bar-shaped pattern extending in the second direction D2. The first interconnection lines M1_I may be arranged at a constant pitch in the first direction D1.

The first metal layer M1 may further include first vias VI1. The first vias VI1 may be provided below the first interconnection lines M1_I. One of the first vias VI1 may be interposed between the active contact AC and the first interconnection line M1_I to electrically connect them to each other. Another of the first vias VI1 may be interposed between the gate contact GC and the first interconnection line M1_I to electrically connect them to each other.

The first interconnection line M1_I and the first via VI1 thereunder may be formed by separate processes, respectively. For example, each of the first interconnection line M1_I and the first via VI1 of the first metal layer M1 may be formed by a single damascene process. The semiconductor device according to the present example embodiment may be fabricated using a sub-20 nm process.

The second metal layer M2 may be provided in the fourth interlayer insulating layer 140. The second metal layer M2 may include second interconnection lines M2_I. Each of the second interconnection lines M2_I may be patterns that are formed using the second and third correction patterns COP2 and COP3 of FIG. 37.

The second metal layer M2 may further include second vias VI2. The second vias VI2 may be provided below the second interconnection lines M2_I, respectively. The first interconnection line M1_I and the second interconnection line M2_I may be electrically connected to each other through the second via VI2.

The second interconnection line IL2 and the second via VI2 thereunder may be formed by the same process, and in this case, they may constitute a single object. For example, the second interconnection line M2_I and the second via VI2 of the second metal layer M2 may be formed together by a dual damascene process.

The interconnection lines of the first metal layer M1 may be formed of or include a conductive material that is the same as or different from that of the second metal layer M2. For example, the interconnection lines of the first and second metal layers M1 and M2 may be formed of or include one or more of aluminum, copper, tungsten, molybdenum, or cobalt. Although not shown, a plurality of stacked metal layers may be further disposed on the fourth interlayered insulating layer 140. Each of the stacked metal layers may include routing lines.

FIGS. 40A to 40D are sectional views respectively taken along lines A-A', B-B', C-C', and D-D' of FIG. 38 to illustrate a semiconductor device according to an example embodiment. In the following description, elements previously described with reference to FIGS. 38 and 39A to 39D will be identified by the same reference number without repeating an overlapping description thereof.

Referring to FIGS. 38 and 40A to 40D, the substrate 100 including the first active region PR and the second active region NR may be provided. The device isolation layer ST may be provided on the substrate 100. The device isolation layer ST may define the first and second active patterns AP1 and AP2 in an upper portion of the substrate 100. The first and second active patterns AP1 and AP2 may be defined on the first and second active regions PR and NR, respectively.

The first active pattern AP1 may include the first channel patterns CH1, which are vertically stacked. The stacked first channel patterns CH1 may be spaced apart from each other in the third direction D3. The stacked first channel patterns CH1 may be vertically overlapped with each other. The second active pattern AP2 may include the second channel patterns CH2, which are vertically stacked. The stacked second channel patterns CH2 may be spaced apart from each other in the third direction D3. The stacked second channel patterns CH2 may be vertically overlapped with each other. The first and second channel patterns CH1 and CH2 may be formed of or include one or more of silicon (Si), germanium (Ge), or silicon-germanium (SiGe).

The first active pattern AP1 may further include the first source/drain patterns SD1. The stacked first channel patterns CH1 may be interposed between each adjacent pair of the first source/drain patterns SD1. The stacked first channel patterns CH1 may connect the adjacent pair of the first source/drain patterns SD1 to each other.

The second active pattern AP2 may further include the second source/drain patterns SD2. The stacked first channel patterns CH1 may be interposed between each adjacent pair of the first source/drain patterns SD1. The stacked second channel patterns CH2 may connect the adjacent pair of the second source/drain patterns SD2 to each other.

The gate electrodes GE may be provided to cross the first and second channel patterns CH1 and CH2 and to extend in the first direction D1. The gate electrode GE may be vertically overlapped with the first and second channel patterns CH1 and CH2. A pair of the gate spacers GS may be disposed on opposite side surfaces of the gate electrode GE. The gate capping pattern GP may be provided on the gate electrode GE.

Figure 40A:
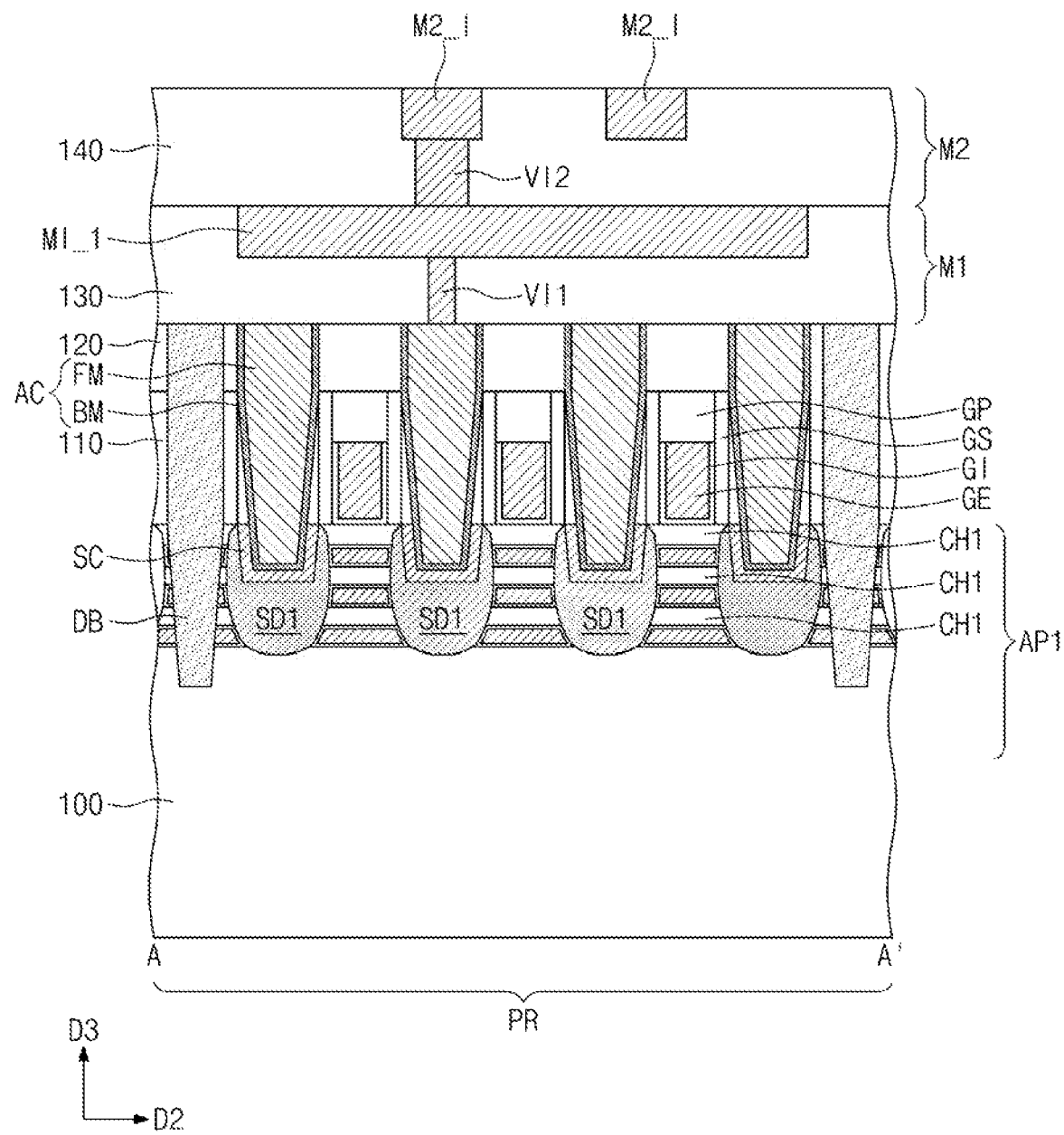
FIGS. 40A to 40D are sectional views taken along lines A-A', B-B', C-C', and D-D', respectively, of FIG. 38 to illustrate a semiconductor device according to another example embodiment.
Figure 40B:
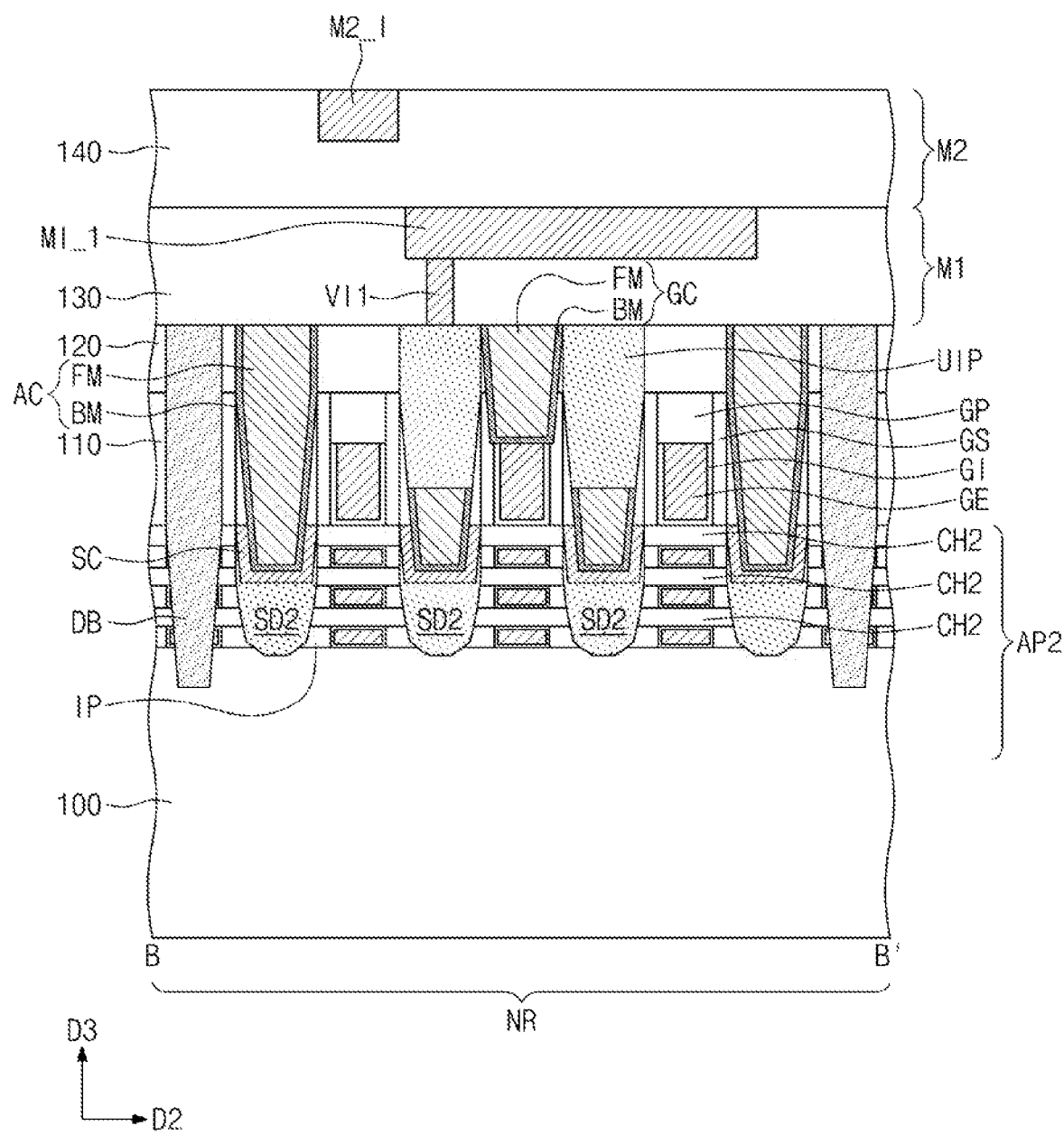
Figure 40C:
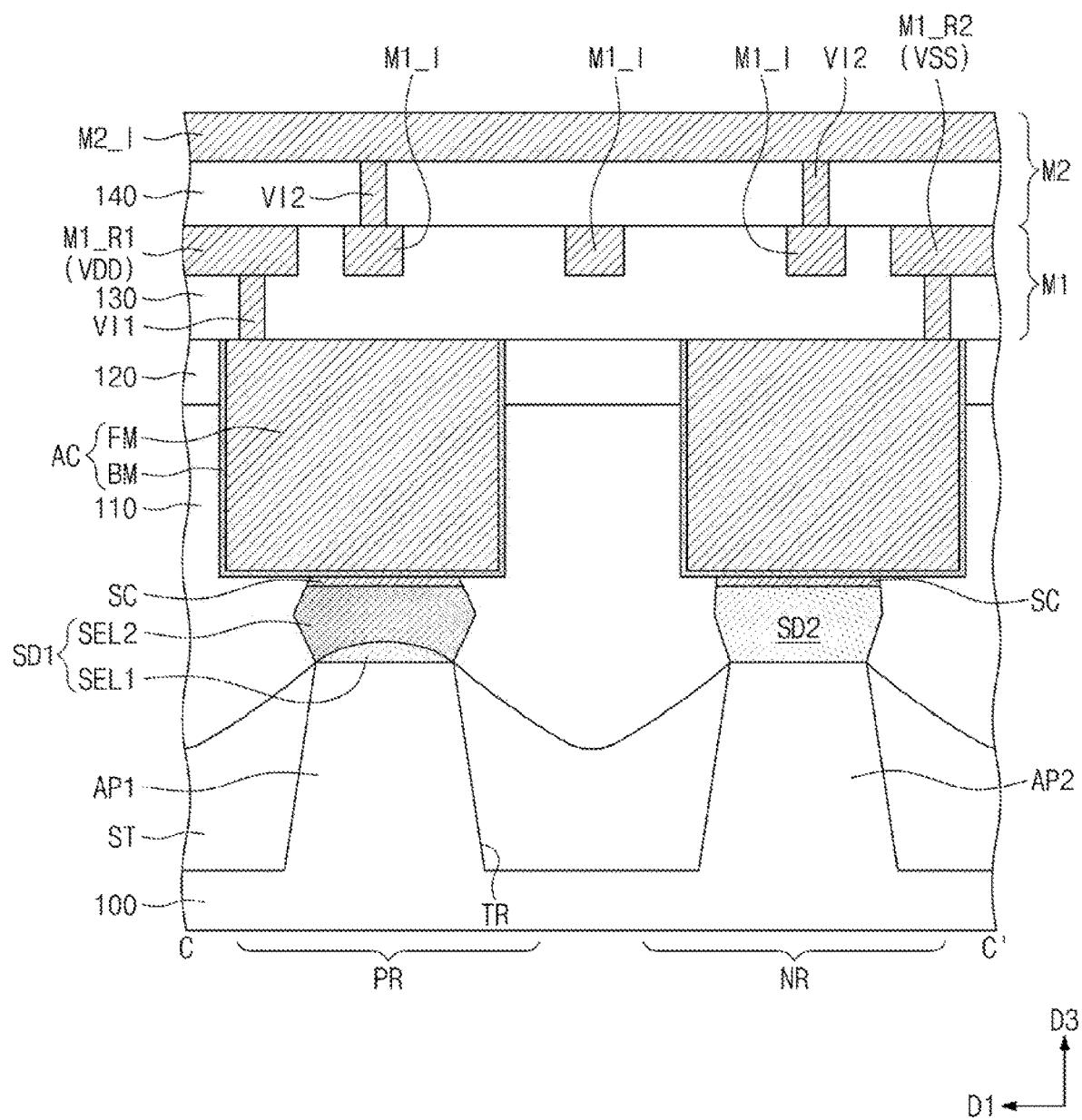
Figure 40D:
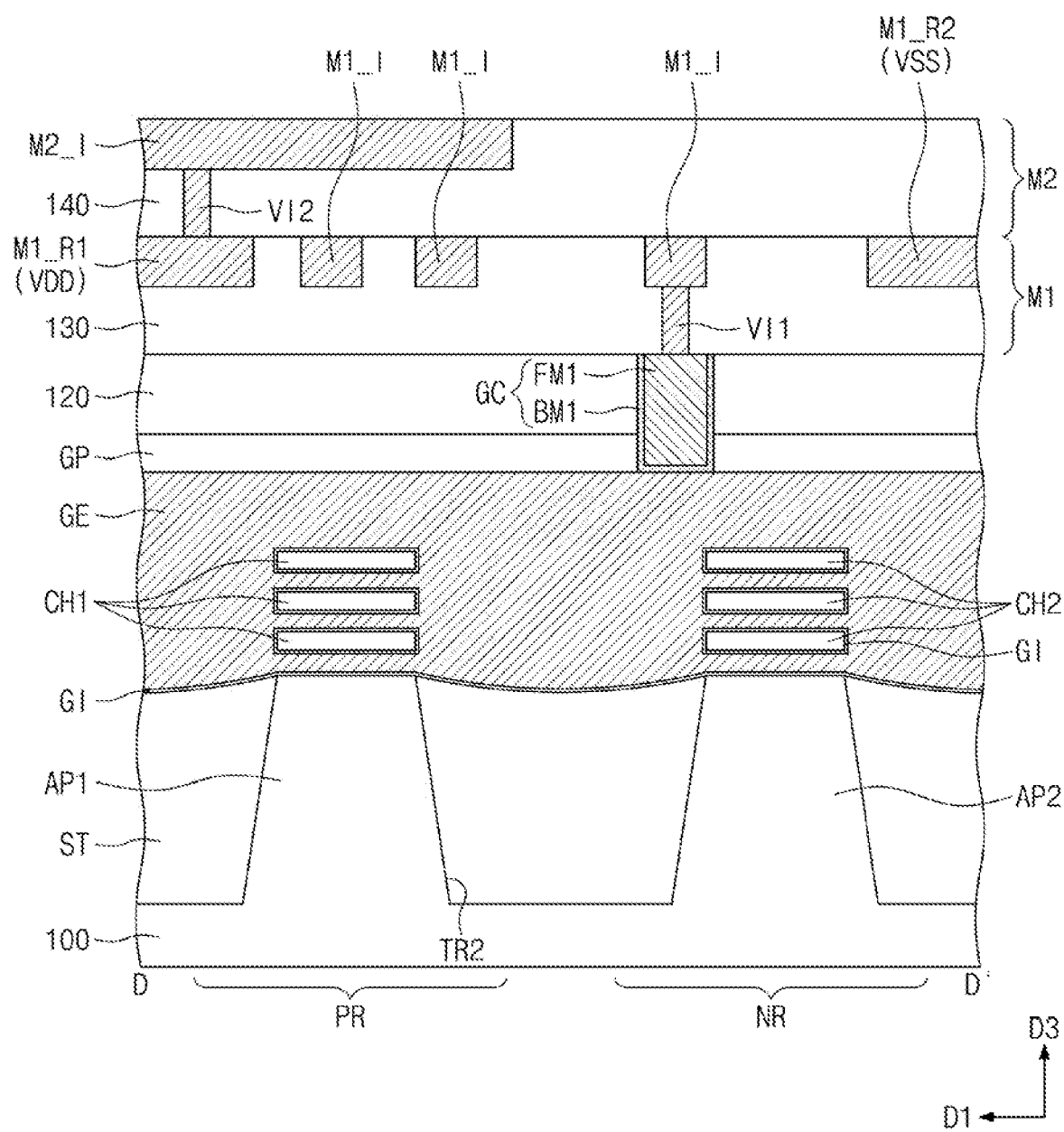

Referring to FIG. 40D, the gate electrode GE may be provided to surround each of the first and second channel patterns CH1 and CH2 (e.g., see FIG. 40D). The gate electrode GE may be provided on a first top surface, at least one first side surface, and a first bottom surface of the first channel pattern CH1. The gate electrode GE may be provided on second a top surface, at least one second side surface, and a second bottom surface of the second channel pattern CH2. Thus, the gate electrode GE may surround a top surface, a bottom surface and both side surfaces of each of the first and second channel patterns CH1 and CH2. The transistors according to the present example embodiment may be three-dimensional field effect transistors (e.g., multi-bridge channel field-effect transistors (MBCFETs)), in which the gate electrodes GE are disposed to three-dimensionally surround the channel patterns CH1 and CH2.

The gate dielectric pattern GI may be provided between the gate electrode GE and each of the first and second channel patterns CH1 and CH2. The gate dielectric pattern GI may surround each of the first and second channel patterns CH1 and CH2.

Referring to FIG. 40B, an insulating pattern IP may be interposed between the gate dielectric pattern GI and the second source/drain pattern SD2, on the second active region NR. The gate electrode GE may be spaced apart from the second source/drain pattern SD2 by the gate dielectric pattern GI and the insulating pattern IP. The insulating pattern IP may be omitted on the first active region PR.

The first interlayer insulating layer 110 and the second interlayer insulating layer 120 may be provided on the substrate 100. The active contacts AC may be provided to penetrate the first and second interlayer insulating layers 110 and 120 and to be connected to the first and second source/drain patterns SD1 and SD2, respectively. The gate contact GC may be provided to penetrate the second interlayer insulating layer 120 and the gate capping pattern GP and to be electrically connected to the gate electrode GE.

The third interlayer insulating layer 130 may be provided on the second interlayer insulating layer 120. The fourth interlayer insulating layer 140 may be provided on the third interlayer insulating layer 130. The first metal layer M1 may be provided in the third interlayer insulating layer 130. The second metal layer M2 may be provided in the fourth interlayer insulating layer 140.

As described above, embodiments relate to a method capable of realizing an improved accuracy and a reduced operation time in an optical proximity correction (OPC) operation that is performed as a part of a process of manufacturing a semiconductor device.

Embodiments may provide a method capable of performing an optical proximity correction (OPC) operation, performed as a part of a process of manufacturing a semiconductor device, with an improved accuracy and a reduced operation time.

In a method of designing and manufacturing a semiconductor device according to an example embodiment, by using a virtual netlist and a virtual layout, it may be possible to obtain OPC results for a BEOL layer before actually designing a semiconductor device. By exploiting the previously-obtained OPC results, it may be possible to significantly reduce time required to finish an OPC operation. As a result, it may be possible to reduce the time taken to develop and manufacture a semiconductor device.

In a method of designing and manufacturing a semiconductor device according to an example embodiment, the obtained OPC results may be evaluated in advance, and thus, it may be possible to obtain an accurate OPC result for an OPC weak region. As a result, the reliability and production yield of a semiconductor device may be improved.

Embodiments or portions thereof may be implemented by hardware or code, including, software, firmware, middleware, microcode, hardware description languages, etc. Code may be stored in a machine-, processor-, or computer-readable storage medium, which may be a non-transitory machine-, computer-, or processor-readable storage medium. Hardware, a machine, a computer, a processor, etc., may be configured, programmed, etc. to perform the embodiments or portions thereof. Embodiments are also directed to a non-transitory computer-readable medium storing code that, when executed by a machine, processor, computer, etc., causes the same to perform embodiments or portions thereof.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of manufacturing a semiconductor device, the method comprising:
designing the semiconductor device, the designing of the semiconductor device including executing a program code in a computer-readable medium by a processor; and
performing a photolithography process on a first substrate based on a designed result,
wherein the designing of the semiconductor device includes:
generating a first virtual layout by placing and routing standard cells using a virtual netlist;
searching first duplicate pattern regions in the first virtual layout and choosing one of them as a first representative pattern region;
performing an OPC operation on the first representative pattern region to obtain a first OPC result;
generating an actual layout by placing and routing standard cells using an actual netlist; and
performing an OPC operation on the actual layout,
wherein the performing of the OPC operation on the actual layout includes:
searching a first pattern region, which is a same as the first representative pattern region, in the actual layout; and
applying the first OPC result to the first pattern region, and
wherein the performing of the photolithography process includes forming a first photoresist pattern on the first substrate using a first photomask manufactured based on the actual layout, to which the OPC operation is applied.

2. The method as claimed in claim 1, wherein the designing of the semiconductor device further includes:
generating a second virtual layout by changing a shape of a pattern in remaining ones of the first duplicate pattern regions, except the first representative pattern region;
searching second duplicate pattern regions in the second virtual layout and choosing one of them as a second representative pattern region; and
performing an OPC operation on the second representative pattern region to obtain a second OPC result, and
wherein the performing of the OPC operation on the actual layout further includes:
searching a second pattern region, which is a same as the second representative pattern region, in the actual layout; and
applying the second OPC result to the second pattern region.

3. The method as claimed in claim 2, wherein the changing of the shape of the pattern includes expanding a line-end of the pattern.

4. The method as claimed in claim 2, wherein the changing of the shape of the pattern includes contracting a line-end of the pattern.

5. The method as claimed in claim 1, wherein each of the first duplicate pattern regions includes a line-end of a first virtual pattern and a line-end of a second virtual pattern, the line-end of the first virtual pattern and the line-end of the second virtual pattern being adjacent to each other.

6. The method as claimed in claim 1, wherein each of the first duplicate pattern regions includes a virtual pattern, which includes at least one first portion, which is extended in a first direction, and at least one second portion, which is extended in a second direction.

7. The method as claimed in claim 1, wherein:
the designing of the semiconductor device further includes evaluating the first OPC result, and
the evaluating of the first OPC result includes manufacturing a second photomask using the first OPC result, and forming a second photoresist pattern on a second substrate through an exposure and develop process using the second photomask.

8. The method as claimed in claim 1, wherein the first OPC result includes:
a simulation image obtained by selecting a virtual pattern in the first representative pattern region as a target; and
a correction pattern generated based on the simulation image.

9. The method as claimed in claim 1, wherein the performing of the OPC operation on the actual layout further includes performing the OPC operation on a remaining pattern region of the actual layout, except the first pattern region.

10. The method as claimed in claim 9, wherein:
the first pattern region includes a line-end of a line pattern, and
the remaining pattern region includes a remaining portion of the line pattern, from which the line-end is excluded.

11. The method as claimed in claim 1, wherein the first virtual layout is a layout for one of metal layers to be formed a back-end-of-line (BEOL) operation in a semiconductor manufacturing process.

12. The method as claimed in claim 1, wherein the actual netlist is a netlist of a logic device.

13. A method of manufacturing a semiconductor device, the method comprising:
generating a first virtual layout by placing and routing standard cells using a virtual netlist;
searching first duplicate pattern regions in the first virtual layout and choosing one of them as a first representative pattern region;
generating a second virtual layout by changing a shape of a pattern in remaining ones of the first duplicate pattern regions, except the first representative pattern region;
searching second duplicate pattern regions in the second virtual layout and choosing one of them as a second representative pattern region;
performing an OPC operation on the first and second representative pattern regions to obtain a first OPC result and a second OPC result, respectively;
performing an OPC operation on an actual layout using the first and second OPC results; and
forming a photoresist pattern on a substrate, using a photomask manufactured based on the actual layout, to which the OPC operation is applied.

14. The method as claimed in claim 13, further comprising repeating operations of:
changing a shape of a pattern in a duplicate pattern region to generate a new virtual layout; and
searching new duplicate pattern regions and choosing one of them as a representative pattern region.

15. The method as claimed in claim 13, wherein the changing of the shape of the pattern includes expanding or contracting a line-end of the pattern.

16. The method as claimed in claim 13, wherein each of the first duplicate pattern regions includes a line-end of a first virtual pattern and a line-end of a second virtual pattern, the line-end of the first virtual pattern being adjacent to the line-end of the second virtual pattern.

17. The method as claimed in claim 13, further comprising evaluating the first and second OPC results.

18. The method as claimed in claim 13, wherein the performing of the OPC operation on the actual layout includes:
applying the first OPC result to a first pattern region, which is a part of the actual layout and is a same as the first representative pattern region;
applying the second OPC result to a second pattern region, which is a part of the actual layout and is a same as the second representative pattern region; and
applying the OPC operation on a remaining pattern region of the actual layout, except the first and second pattern regions.

19. The method as claimed in claim 13, wherein the first and second virtual layouts are layouts for one of metal layers to be formed a back-end-of-line (BEOL) operation in a semiconductor manufacturing process.

20. The method as claimed in claim 13, wherein the actual layout is a layout of a logic device.

* * * * *